US011947064B2

United States Patent
Lemarenko et al.

(10) Patent No.: US 11,947,064 B2
(45) Date of Patent: Apr. 2, 2024

(54) AUTOMATIC RECOGNITION OF ENVIRONMENTAL PARAMETERS WITH AZIMUTHALLY DISTRIBUTED TRANSDUCERS

(71) Applicant: Schlumberger Technology Corporation, Sugar Land, TX (US)

(72) Inventors: Mikhail Lemarenko, Beijing (CN); Roel Van Os, Clamart (FR); Orland Guedes, Clamart (FR); Thilo Michael Brill, Clamart (FR); Hiroshi Hori, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 339 days.

(21) Appl. No.: 17/520,016

(22) Filed: Nov. 5, 2021

(65) Prior Publication Data
US 2022/0146702 A1 May 12, 2022

(30) Foreign Application Priority Data
Nov. 6, 2020 (EP) ..................... 20306347

(51) Int. Cl.
*G01V 1/52* (2006.01)
*G01V 1/30* (2006.01)
(52) U.S. Cl.
CPC ............... *G01V 1/52* (2013.01); *G01V 1/303* (2013.01); *G01V 2001/526* (2013.01)
(58) Field of Classification Search
CPC .......... G01V 1/52; G01V 1/526; G01V 1/303
See application file for complete search history.

(56) References Cited

U.S. PATENT DOCUMENTS

| 3,918,024 A | 11/1975 | Macovski |
| 5,001,676 A | 3/1991 | Broding |

(Continued)

FOREIGN PATENT DOCUMENTS

| EP | 1348954 A1 | 10/2003 |
| EP | 3151037 A1 | 4/2017 |

(Continued)

OTHER PUBLICATIONS

A Hayman et al., High-Resolution Cementation And Corrosion Imaging By Ultrasound, SPWLA 32nd Annual Logging Symposium, Jun. 16-19, 1991, 25 pages.

(Continued)

*Primary Examiner* — Krystine E Breier
(74) *Attorney, Agent, or Firm* — Jeffrey D. Frantz

(57) ABSTRACT

Methods and apparatus for automatic recognition of environmental parameters with azimuthally distributed transducers. For example, a toolstring is disposed in a cased portion of a borehole penetrating a subsurface formation. The toolstring comprises a module comprising azimuthally distributed acoustic transducers each operable to emit and receive acoustic signals. The module is operated to emit an acoustic signal into fluid surrounding the module in the casing and record data indicative of receipt, by a plurality of the transducers, of acoustic waveforms resulting from interaction of the emitted acoustic signal with the casing, including at least a non-specular diffraction head wave excited by a guided wave that is excited by diffraction of the acoustic signal propagating in the casing metal. Acoustic velocity of the guided wave in the casing metal is determined utilizing the recorded data and geometric parameters of the module.

15 Claims, 11 Drawing Sheets

(56) References Cited

U.S. PATENT DOCUMENTS

| | | | |
|---|---|---|---|
| 6,483,777 | B1 | 11/2002 | Zeroug |
| 7,522,471 | B2 | 4/2009 | Froelich et al. |
| 2006/0233048 | A1 | 10/2006 | Froelich et al. |
| 2017/0090058 | A1* | 3/2017 | Brill .......................... G01V 1/50 |

FOREIGN PATENT DOCUMENTS

| | | |
|---|---|---|
| EP | 3151038 A1 | 4/2017 |
| EP | 3290961 A1 | 3/2018 |
| EP | 3862796 A1 | 8/2021 |

OTHER PUBLICATIONS

Zeroug, S. and Froelich, B.; Ultrasonic leaky-lamb wave imaging through a highly contrasting layer, Ultrasonics 2003 (5 pages).

Glorieux, On the character of acoustic waves at the interface between hard and soft solids and liquids, The Journal of the Acoustical Society of America, 110, 3, 1299 (2001).

M.P. Ekstrom, Dispersion estimation from borehole acoustic arrays using a modified matrix pencil algorithm, Conference Record of the Twenty-Ninth Asilomar Conference on Signals, Systems and Computers, 1, pp. 449-453, 1995.

Schlumberger Sonic Scanner, 2005 (7 pages).

Extended Search Report issued in EP Application 20306347.4, dated Apr. 30, 2021 (7 pages).

J.L.Rose, Ultrasonic Nondestructive Testing Principles, Analysis and Display Technology, Ultrasonic guided waves in solid media 1999, pp. 423-445.

Snell's law, Introduction to Phased Array Ultrasonic Technology Applications, (OLYMPUS 2017) pp. 34-36.

Basic Convepts of Phased Array Ultrasonic Technology, Introduction to Phased Array Ultraosonic Technology Applications, 2017 by OLYMPUS, pp. 9-21.

Communication Pursuant to Article 94(3) issued in European Patent Application No. 20306347.4 dated Sep. 25, 2023, 6 pages.

\* cited by examiner

AUTOMATIC RECOGNITION OF ENVIRONMENTAL PARAMETERS WITH AZIMUTHALLY DISTRIBUTED TRANSDUCERS

CROSS-REFERENCE TO RELATED APPLICATIONS

This application claims priority to and the benefit of a European Patent Application having Application No. EP 20306347.4 filed Nov. 6, 2020, which is incorporated by reference herein.

BACKGROUND OF THE DISCLOSURE

Ultrasonic downhole imaging tools are used in oil and gas exploration and production (E&P) in both cased and uncased ("open") boreholes. For example, when utilized in cased boreholes, such ultrasonic imaging may be performed to inspect the casing and the cement securing the casing in the borehole. When utilized in open boreholes, ultrasonic imaging may be performed to obtain an image of the borehole surface, such as to identify vugs, fractures, texture and acoustic properties of the subterranean formation penetrated by the borehole.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method including disposing a toolstring in a cased portion of a borehole penetrating a subsurface formation. The cased borehole portion includes a casing. A module of the toolstring includes azimuthally distributed acoustic transducers each operable to emit and receive acoustic signals. The method also includes operating the module to emit an acoustic signal, from at least one of the transducers, into fluid surrounding the module in the casing. The method also includes operating the module to record data indicative of receipt by at least one of the transducers of the emitted acoustic signal. The method also includes determining at least one parameter utilizing the recorded data and geometric parameters of the module. The at least one determined parameter includes acoustic velocity of the fluid ($V_{mud}$).

The present disclosure also introduces a method including disposing a toolstring in a cased portion of a borehole penetrating a subsurface formation, the cased borehole portion including a metal casing, and the toolstring including a module having acoustic transducers distributed azimuthally around the toolstring and each operable to emit and receive acoustic signals. The method also includes operating the module to emit an acoustic signal, from at least one of the transducers, into fluid surrounding the module in the casing. The method also includes operating the module to record data indicative of receipt, by two or more of the transducers, of acoustic waveforms resulting from interaction of the emitted acoustic signal with the casing, including at least a non-specular diffraction head wave excited by a guided wave that is excited by diffraction of the acoustic signal propagating in the casing metal. The method also includes determining acoustic velocity of the guided wave in the casing metal ($V_{guided}$) utilizing the recorded data and geometric parameters of the module.

The present disclosure also introduces a system including a toolstring for conveyance within a cased portion of a borehole penetrating a subsurface formation. The cased borehole portion includes a metal casing and the toolstring comprises a module comprising acoustic transducers distributed azimuthally around the toolstring and each operable to emit and receive acoustic signals. The module is operable to emit an acoustic signal, from at least one of the transducers, into fluid surrounding the module in the casing. The module is also operable to record data indicative of receipt, by two or more of the transducers, of acoustic waveforms resulting from interaction of the emitted acoustic signal with the casing, including at least a non-specular diffraction head wave excited by a guided wave that is excited by diffraction of the acoustic signal propagating in the casing metal. The system also includes a processing system having a processor and a memory storing instructions executable by the processor for determining $V_{guided}$ utilizing the recorded data and geometric parameters of the module.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
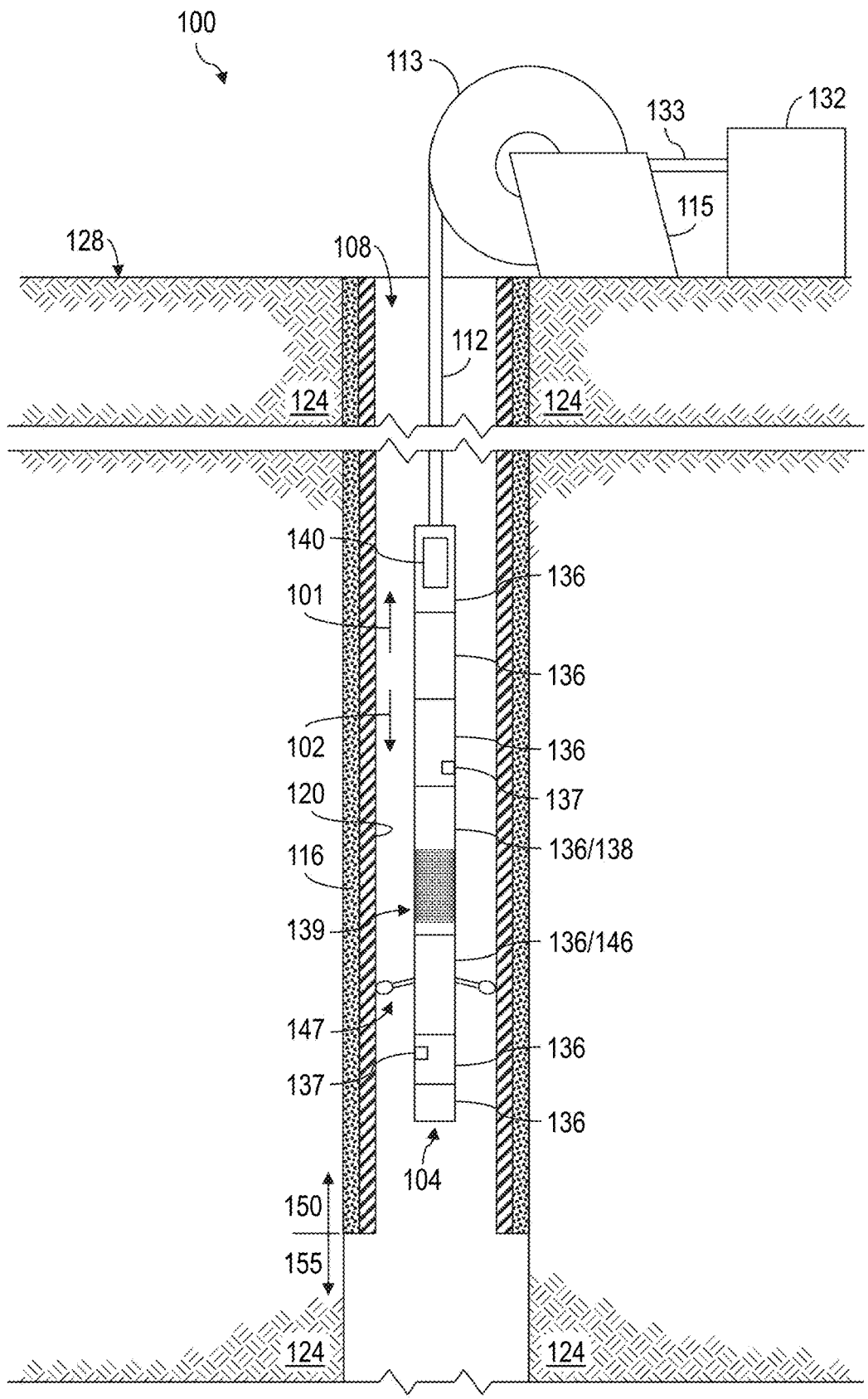
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity and does not in itself dictate a relationship between the various embodiments and/or configurations discussed. Moreover, the description of a first feature in contact with a second feature in the description that follows may include implementations in which the first and second features are in direct contact, and may also include implementations in which additional features may interpose the first and second features, such that the first and second features may not be in direct contact.

FIG. 1 is a schematic view of at least a portion of an example implementation of a wellsite system 100 to which one or more aspects of the present disclosure may be applicable. The wellsite system 100 may be onshore (as depicted) or offshore. In the example wellsite system 100 shown in FIG. 1, a toolstring 104 is conveyed in a borehole 108 via a wireline, slickline, and/or other conveyance means 112. The example wellsite system 100 may be utilized for evaluation of the borehole 108, casing 120 installed in the borehole 108, cement 116 securing the casing 120 within the borehole 108, a tubular (not shown) secured in the casing 120 (e.g., production services tubing), and/or a subterranean formation 124 penetrated by the borehole 108, including in cased 150 or/and open hole 155 sections. While most of the borehole 108 is depicted in FIG. 1 as being cased 150, a more substantial portion of the borehole 108 (e.g., much more than half, such as more than 90%) may be open hole 155 without the cement 116 or the casing 120.

The toolstring 104 is suspended in the borehole 108 from the lower end of the conveyance means 112. The conveyance means 112 may be a single- or multi-conductor slickline or wireline logging cable spooled on a drum 113 of a winch 115 at the surface 128 of the wellsite from whence the borehole 108 extends. The wellsite surface 128 is the generally planar surface of the terrain (i.e., Earth's surface), a floor of a rig (not shown) at the wellsite, or other equipment at the wellsite, which is perpendicularly penetrated by the borehole 108. Operation of the winch 115 rotates the drum 113 to reel in the conveyance means 112 and thereby pull the toolstring 104 in an uphole direction 101 in the borehole 108, as well as to reel out the conveyance means 112 and thereby move the toolstring 104 in a downhole direction 102 in the borehole 108. The conveyance means 112 may include at least one or more conductors (not shown) that facilitate data communication between the toolstring 104 and surface equipment 132 disposed at the wellsite surface 128, including through one or more slip rings, cables, and/or other conductors (schematically depicted in FIG. 1 by reference number 133) electrically connecting the one or more conductors of the conveyance means 112 with the surface equipment 132. The conveyance means 112 may alternatively transport the tool string without a conductor inside the cable but with at least one module that can autonomously acquire and/or process and/or store downhole measurements in downhole memory without human intervention or communication with the surface equipment 132.

Although not illustrated as such in FIG. 1, the winch 115 may be disposed on a service vehicle or a stationary skid/platform. The service vehicle or stationary skid/platform may also contain at least a portion of the surface equipment 132.

The toolstring 104 comprises a plurality of modules 136, one or more of which may comprise an elongated housing and/or mandrel carrying various electronic and/or mechanical components. For example, at least one of the modules 136 may be or comprise at least a portion of a device for measuring a feature and/or characteristic of the borehole 108, the casing 120, a tubular installed in the casing 120 (not shown), the cement 116, and/or the formation 124, and/or a device for obtaining sidewall or inline core and/or fluid (liquid and/or gas) samples from the borehole 108 and/or formation 124. Other implementations of the downhole toolstring 104 within the scope of the present disclosure may include additional or fewer components or modules 136 relative to the example implementation depicted in FIG. 1.

The wellsite system 100 also includes a data processing system that may include at least a portion of one or more of the surface equipment 132, control devices and/or other electrical and/or mechanical devices in one or more of the modules 136 of the toolstring 104 (such as a downhole controller 140), a remote computer system (not shown), communication equipment, and/or other equipment. The data processing system may include one or more computer systems or devices and/or may be a distributed computer system. For example, collected data or information may be stored, distributed, communicated to a human wellsite operator, and/or processed locally (downhole or at surface) and/or remotely.

The data processing system may, whether individually or in combination with other system components, perform the methods and/or processes described below, or portions thereof. For example, the data processing system may include processor capability for collecting caliper, acoustic, ultrasonic, and/or other data related to the evaluation of the cement 116, the casing 120, a tubular installed in the casing 120 (not shown), the formation 124, and/or fluid (not shown) in the borehole 108, according to one or more aspects of the present disclosure. Methods and/or processes within the scope of the present disclosure may be implemented by one or more computer programs that run in a processor located, for example, in one or more modules 136 of the toolstring 104 and/or the surface equipment 132. Such programs may utilize data received from the downhole controller 140 and/or other modules 136 and may transmit control signals to operative elements of the toolstring 104, where such communication may be via one or more electrical or optical conductors of the conveyance means 112. The programs may be stored on a tangible, non-transitory, computer-usable storage medium associated with the one or more processors of the downhole controller 140, other modules 136 of the toolstring 104, and/or the surface equipment 132, or may be stored on an external, tangible, non-transitory, computer-usable storage medium that is electronically coupled to such processor(s). The storage medium may be one or more known or future-developed storage media, such as a magnetic disk, an optically readable disk, flash memory, or a computer-readable device of another kind, including a remote storage device coupled over one or more wired and/or wireless communication links, among other examples.

As designated in FIG. 1 by reference number 138, at least one of the modules 136 may be or comprise a module 138 comprising a plurality of azimuthally distributed acoustic transducers operable for acquiring acoustic measurements characterizing the borehole 108, the casing 120, a tubular installed in the casing 120 (not shown), the cement 116, and/or fluid (not shown) in the borehole 108. The module 138 may be a phased array module comprising a phased array 139 of acoustic transducers that may each be operated as an acoustic transmitter and/or receiver, wherein an electronics device of the phased array module operates transducers collectively in manners permitting generating a beam that can be swept electronically. Example implementations of a phased array module within the scope of the present disclosure are described below. However, implementations within the scope of the present disclosure include those in which the module 138 is not a phased array module, such as implementations in which the module 130 comprises a plurality of transducers that are operated independently from each other.

The one or more modules 136 may also include an orientation module permitting measurement of the azimuth of the transducer module 138. Such module may include, for example, one or more of relative bearing (RB) or gravity/acceleration sensors, magnetometers, and gyroscope sensors, among other examples.

As designated in FIG. 1 by reference number 146, another one (or more) of the modules 136 may be or comprise a centralizer module. For example, the centralizer module 146 may comprise an electric motor driven by a controller (neither shown) and/or other means for actively extending ("opening") and retracting ("closing") a plurality of centralizing arms 147. Although only two centralizing arms 147 are depicted in the example implementation shown in FIG. 1, other implementations within the scope of the present disclosure may have more than two centralizing arms 147. Extension of the centralizing arms 147 aids in urging the transducer module 138 to a central position within the casing 120, another tubular, or the borehole 108 being investigated by the transducer module 138. Implementations of toolstrings within the scope of the present disclosure may include more than one instance of the transducer module 138 and/or more than one instance of the centralizer module 146. The modules 136 may be conveyed in either or both of open hole 150 and cased hole 155 sections, including implementations in which the centralizer module 146 and the transducer module 138 may be configured or configurable for use in either or both of the two sections. The toolstring 104 may also be deprived of the centralizer module 146.

Figure 2:
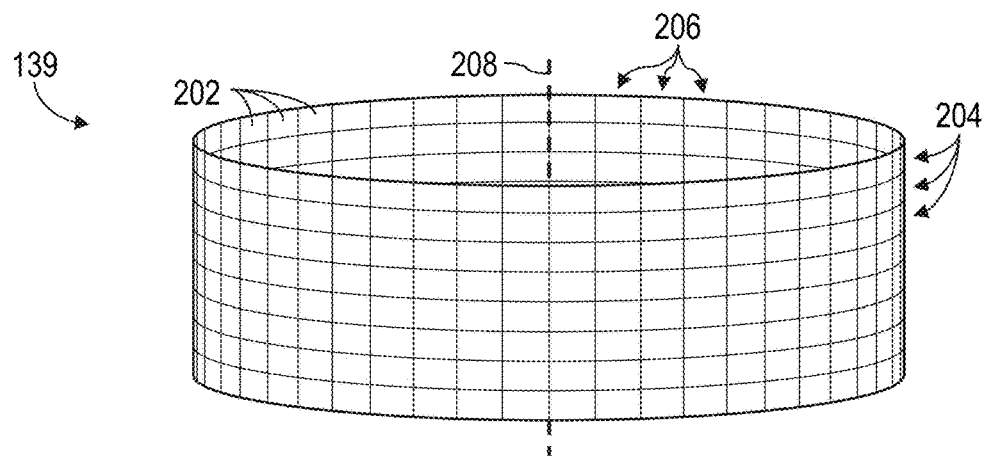
FIG. 2 is a perspective view of at least a portion of an example implementation of a phased array according to one or more aspects of the present disclosure.

FIG. 2 is a perspective view of at least a portion of an example implementation of the phased array 139 according to one or more aspects of the present disclosure. Having a phased array downhole that includes transducers distributed azimuthally around the toolstring permits obtaining azimuthal measurements relative to the borehole 108 without rotation of the toolstring 104, a module 136 of the toolstring 104, and/or a sensor of one of the modules 136.

The phased array 139 comprises acoustic transducer elements ("transducers") 202 arranged in eight rows 204 and 48 columns 206 extending around a central axis 208. However, implementations of the phased array 139, other phased arrays, and other modules 138 within the scope of the present disclosure may include different numbers (including one) of rows 204 and/or columns 206. The phased array 139, other phased arrays, and other modules 138 within the scope of the present disclosure may be configured such that the transducers 202 are collectively disposed azimuthally around a substantial portion (e.g., more than 50%) of the tool, perhaps the entire periphery of the tool.

One or more aspects of the following description are depicted in the context of the module 138 of FIG. 1 having azimuthally distributed transducers, such as the phased array 139 of FIG. 2. However, it is to be understood that such convention is for the sake of clarity and ease of understanding, and that other implementations of the module 138 within the scope of the present disclosure may not comprise a phased array 139, but nonetheless comprise a plurality of azimuthally distributed transducers 202.

The accuracy of some answer products obtained via utilization of the azimuthally distributed transducers 202 depend on the accuracy of the mud propagation velocity $V_{mud}$, which is the velocity of an acoustic signal in the fluid (also known as "mud") surrounding the transducer module 138 in the borehole 108 (although, for the sake of clarity, the mud is not shown in the figures). An example of such answer products is the acoustic impedance of materials (e.g., the cement 116) surrounding the outside of the casing 120 (e.g., see FIG. 1). In the past, $V_{mud}$ has been determined by measuring the propagation time between the firing of an acoustic signal and the receipt of an echo of the acoustic signal reflected from the casing 120, then using this measurement in conjunction with knowledge of the outer diameter of the transducer module 138 (e.g., the collective outer diameter formed by radially outward extents of each transducer 202, referred to herein as DOT for "diameter of tool"), the outer diameter of the casing 120 ($OD_{cas}$), and the wall thickness ($th_{cas}$) of the casing 120. However, the value of one or more of DOT, $OD_{cas}$, and thus may be based on one or more assumptions or unknown factors which can introduce inaccuracies into the $V_{mud}$ determination. Additionally, in some operations, the actual $OD_{cas}$ and/or thus may not be known, such as due to manufacturing tolerances, corrosion, or other undetermined defects of the casing 120.

Figure 3:
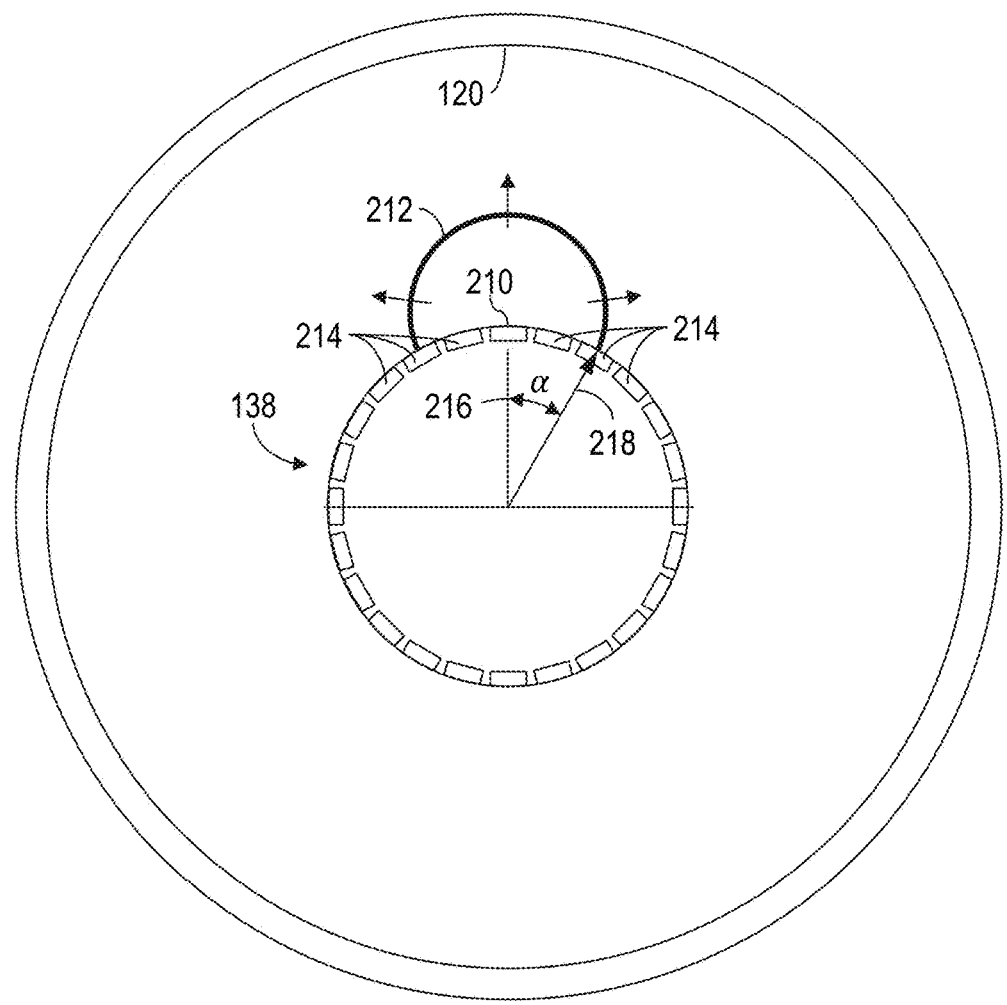
FIG. 3 is a schematic view of at least a portion of an example implementation of a transducer system according to one or more aspects of the present disclosure.

However, the transducer module 138 may be utilized to directly measure $V_{mud}$. For example, as depicted in FIG. 3, a single transducer 210 may emit a circular wavefront 212 that is sensed by each of the other transducers (or at least one or more neighboring transducers 214). If contributions from tool-surface wave propagation and internal tool acoustic transmissions are ignored, $V_{mud}$ can be determined from just the geometric parameters of the transducer module 138. For example, the relationship between $V_{mud}$ and the effective angle (α) 216 between the emitting transducer 210 and each sensing transducer 214 can be expressed as set forth below in Equation (1).

$$\sin\frac{\alpha}{2} = \frac{V_{mud}t}{2R} \tag{1}$$

where t is the propagation time of the wavefront 212 traveling directly from the emitting transducer 210 to the sensing transducer 214 (i.e., not an echo or reflection) and derived from the signals recorded by the transducer module 138, and where R is half of the DOT (i.e., the outer radius 218 of the transducer module 138). For a small angle approximation, Equation (1) can be simplified at set forth below in Equations (2) and (3). However, $V_{mud}$ may be directly determined from Equation (1).

$$\alpha = \frac{V_{mud} t}{R} \quad (2)$$

$$\frac{d\alpha}{dt} = \frac{V_{mud}}{R} \quad (3)$$

Figure 4:
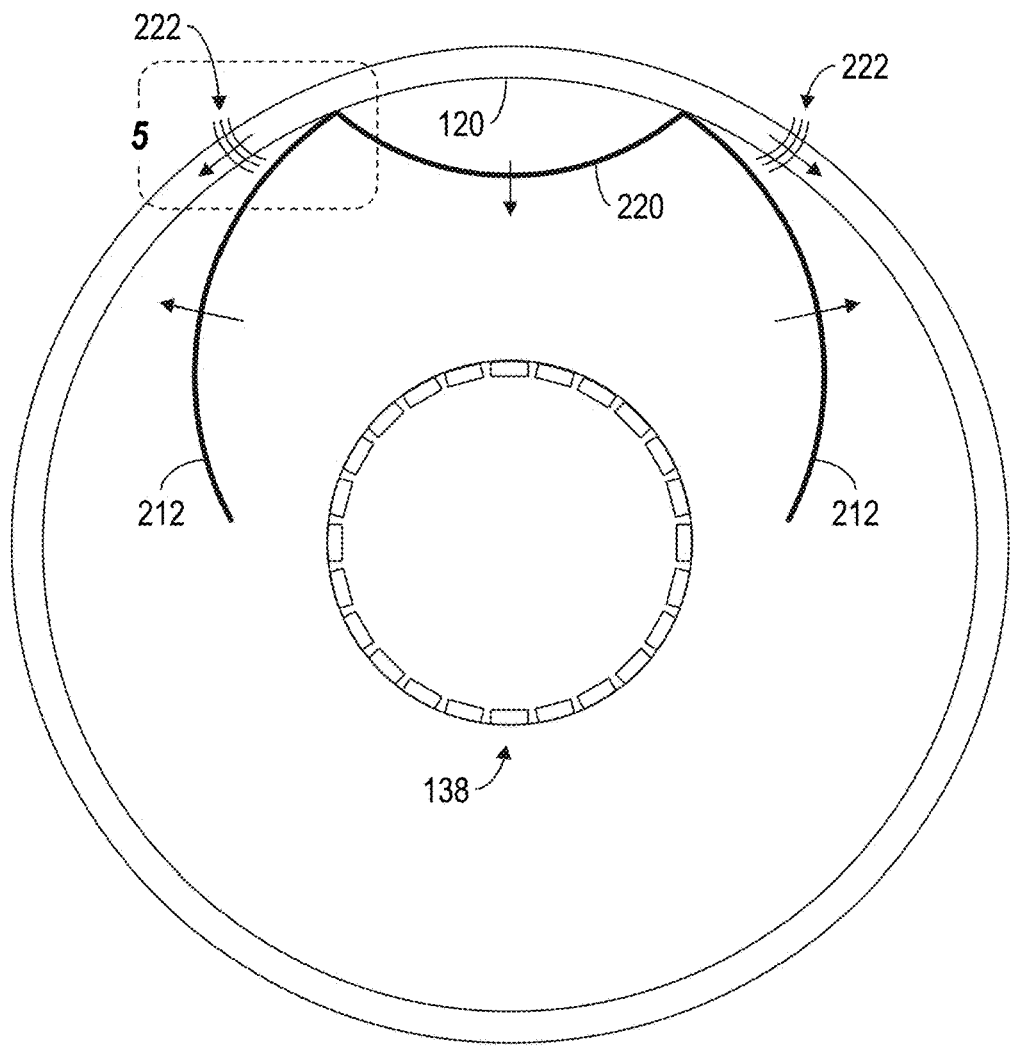
FIG. 4 is another view of FIG. 3 at a later time.
Figure 5:
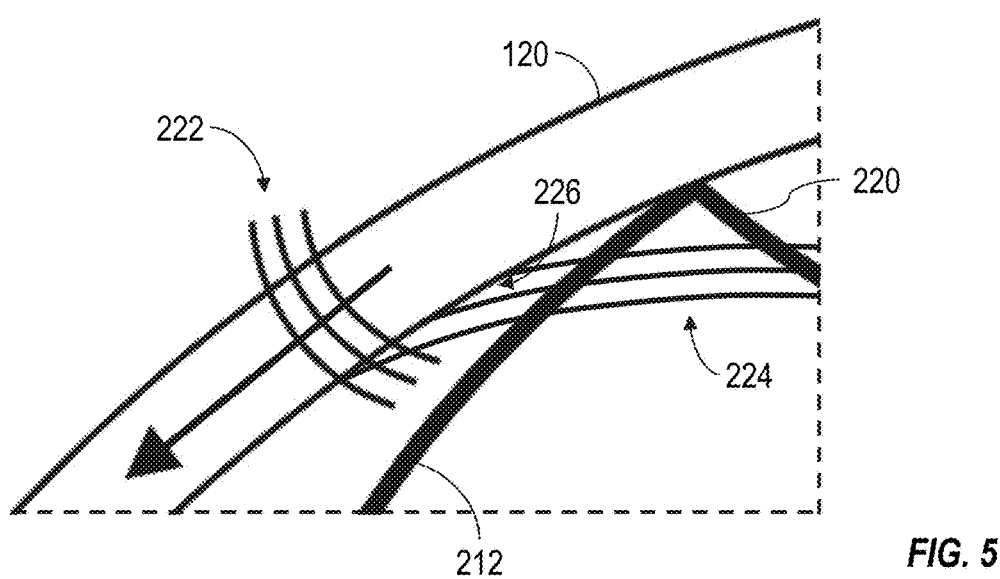
FIG. 5 is an enlarged view of a portion of FIG. 4.

As shown in FIG. 4, the wavefront 212 is reflected at the casing 120, thereby generating a specular reflection wavefront 220. The specular reflection wavefront 220 excites a non-specular diffraction of acoustic waves at the interface between the casing 120 and the fluid in the casing (not shown). For example, as depicted in FIG. 5, which is an enlarged view of a portion of FIG. 4, guided waves 222 such as extensional (also designated S0) and flexural (also designated A0) Lamb waves are excited in the casing 120, as well as surface waves 224 generated by the guided wave 222 at the interface between the fluid and the casing 120. In particular, the extensional (S0) Lamb wave is generally the fastest to propagate in the casing 120 and to arrive at a transducer of the transducer module 138. The flexural mode (A0) is another guided wave that is generally slower than the extensional Lamb wave, that arrives at a transducer during the arrival of the specular reflection, and that may also be detected using the recorded signals even if the specular echo may increase the difficulty of detection compared to the extensional mode.

The term "Lamb waves" regards planar geometry (plates) in a vacuum. However, due to the similarity of the propagation characteristics as captured by the dispersion relationship of Lamb waves with those in the fluid-immersed, cylindrical geometry, the same terms are adopted for the "quasi-Lamb waves" described herein.

An elastic solid of infinite dimensions is characterized by "bulk" compressional and shear propagation velocities of acoustic waves. These are material properties and depend on the intrinsic structure and composition of the material. For an isotropic solid, one distinguishes two elastic moduli: bulk and shear modulus (or, alternatively, two Lame parameters). From these material properties and the density, shear and compressional propagation velocities can be determined.

In restricted geometrical dimensions, such as semi-infinite surfaces, plates of finite thickness, or hollow cylinders, the sound propagation typically exhibits modified velocities, called guided waves. These guided waves (or modes) and surface waves depend on the bulk properties and geometrical parameters (such as thickness or radius). Furthermore, the propagation velocities can be dispersive, i.e., velocities and attenuation depend on frequency. Finally, the medium surrounding the finite solid (such as a borehole fluid (mud) or cement) also affects the propagation velocities and attenuation.

Figure 6:
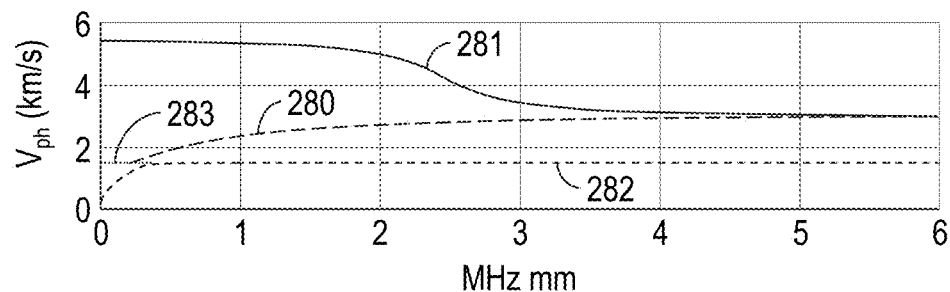
FIGS. 6-8 are graphs each depicting one or more aspects of the present disclosure.
Figure 7:
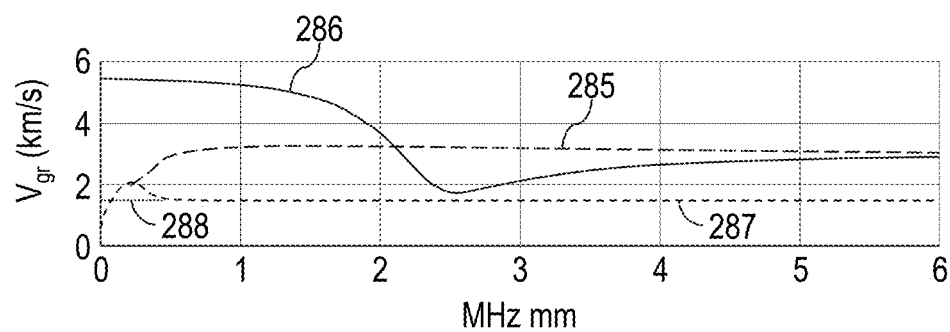
Figure 8:
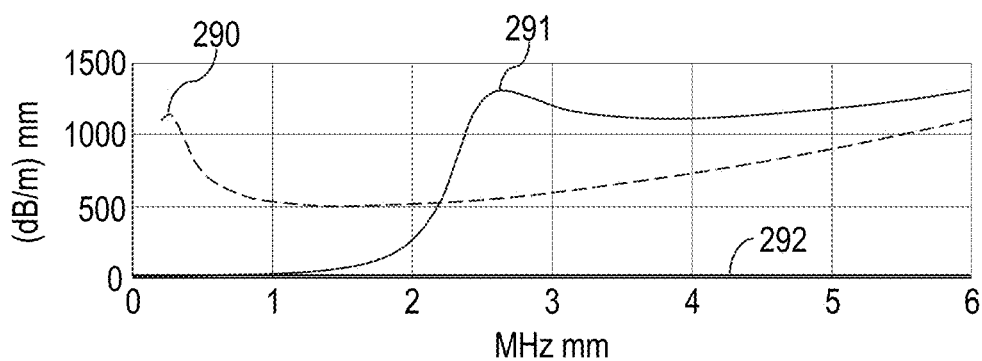

An example of dispersion relations for examples of guided waves in a plate immersed in water is shown in FIGS. 6-8. FIG. 6 shows the phase velocity $V_{ph}$ for the flexural mode 280, the $V_{ph}$ for the extensional mode 281, and the $V_{ph}$ for a Scholte-type interface mode 282, relative to the $V_p$ of the annulus water 283. FIG. 7 shows the group velocity $V_{gr}$ for the flexural mode 285, the $V_{gr}$ for the extensional mode 286, and the $V_{gr}$ for the Scholte-type interface mode 287, relative to the $V_p$ of the annulus water 288. FIG. 8 shows the flexural mode attenuation 290, the extensional mode attenuation 291, and the Scholte-type interface mode attenuation 292.

There are an infinite number of guided waves, but just the lowest orders (lowest frequency) are considered in the context of the present disclosure. Due to the mode dispersion, phase velocity (or a specific frequency component), group velocity (of a finite-time (i.e., finite bandwidth) wave packet), and attenuation (decay of amplitude with travel time) can be utilized to describe the properties of guided waves in their environment.

By general convention, the modes depicted in FIGS. 6-8 are described herein as "quasi-Lamb" modes in analogy to guided waves in plates immersed in vacuum. Similarly, the modes in cylindrical geometry (typically labeled L(0,1), L(0,2) etc., which are comparable to the Lamb modes A0 and S0, respectively) have somewhat different dispersion relations than those in plates, but the lowest order modes retain many characteristics of the plate modes.

For the purposes of the present disclosure, the theory of dispersion relations as a function of geometry and material properties is mathematically well-established. For example, by determining a group velocity for the low frequency (e.g., where (frequency·thickness)~<1 megahertz-mm) S0 extensional mode in a casing, modelling of the dispersion relationship can be used to associate a bulk steel compressional velocity to the measurement.

Many simple asymptotic, analytic, and/or approximate relationships between guided modes and bulk shear and compressional velocities can be found in the prior art. For example, Equation (4) set forth below may be utilized to relate the guide wave extensional velocity $V_{guidedS0}$ with the shear velocity $V_s$ and the compressional velocity $V_p$ of the bulk material.

$$V_{guidedS0} = 2V_s \sqrt{1 - \left(\frac{V_s}{V_p}\right)^2} \quad (4)$$

Similar relationships between the velocity of the guided wave ($V_{guidedA0}$), the shear and compressional velocities in the casing exist for the flexural "quasi-Lamb" mode A0.

Note that these are first order simplifications that permit establishing a relationship between $V_p$ and $V_s$, respectively, for each mode. Determining the velocities of two guided waves permits determining $V_p$ and $V_s$.

More complex models may be used, such as by using modelling of the dispersion curve fitting to a measured guide wave velocity $V_{guided}$ for the S0 and/or A0 modes. The dispersion curve fitting may necessitate estimation of some parameters, such as density of the casing. However, determining $V_{guided}$ at different frequencies constrains the dispersion curve, permitting better results. From the dispersion curve, the shear and compressional velocities of the casing may be obtained by reading the phase velocity at the lowest frequency of respectively the flexural mode 280 and the extensional mode 281.

Therefore, based on the $V_{guided}$ velocity of at least two guided waves in the casing, it becomes possible to obtain information on the shear and compressional velocities of the casing by using the different models that are disclosed above. The section below explains how, using a transducer module described above, the velocity of the guided waves may be determined.

Figure 9:
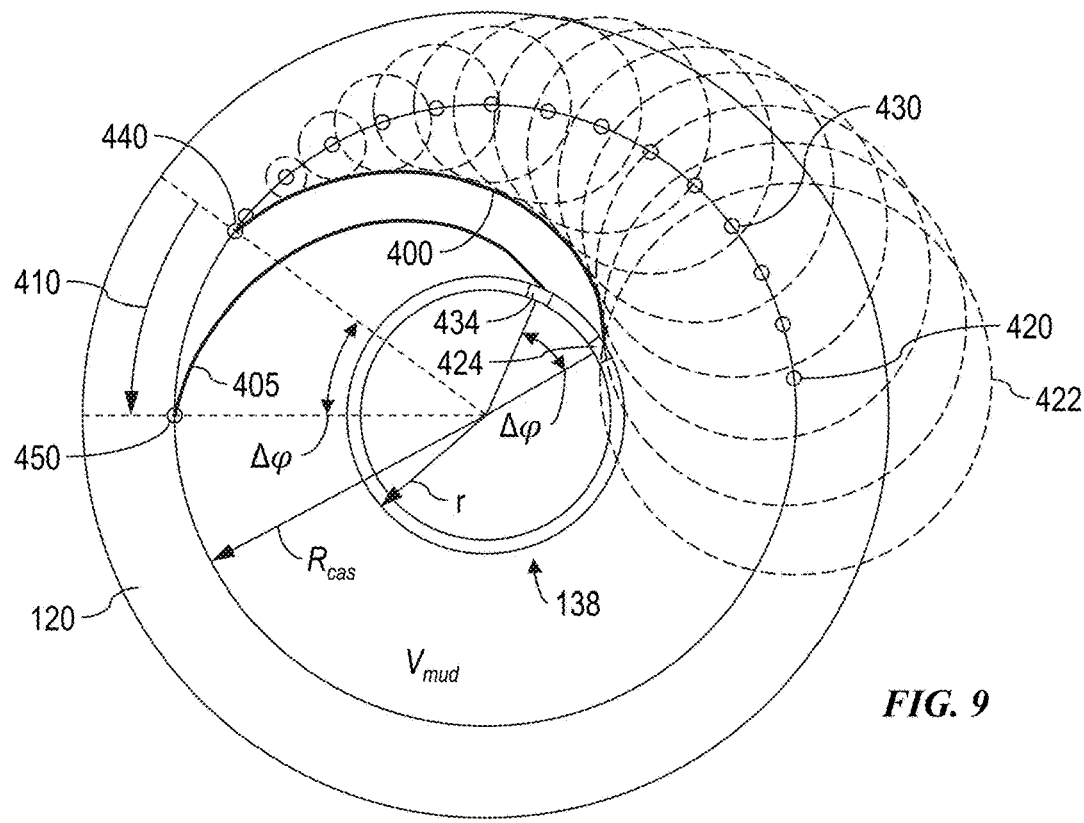
FIG. 9 is a schematic view of wave generation and measurement according to one or more aspects of the present disclosure.
Figure 10:
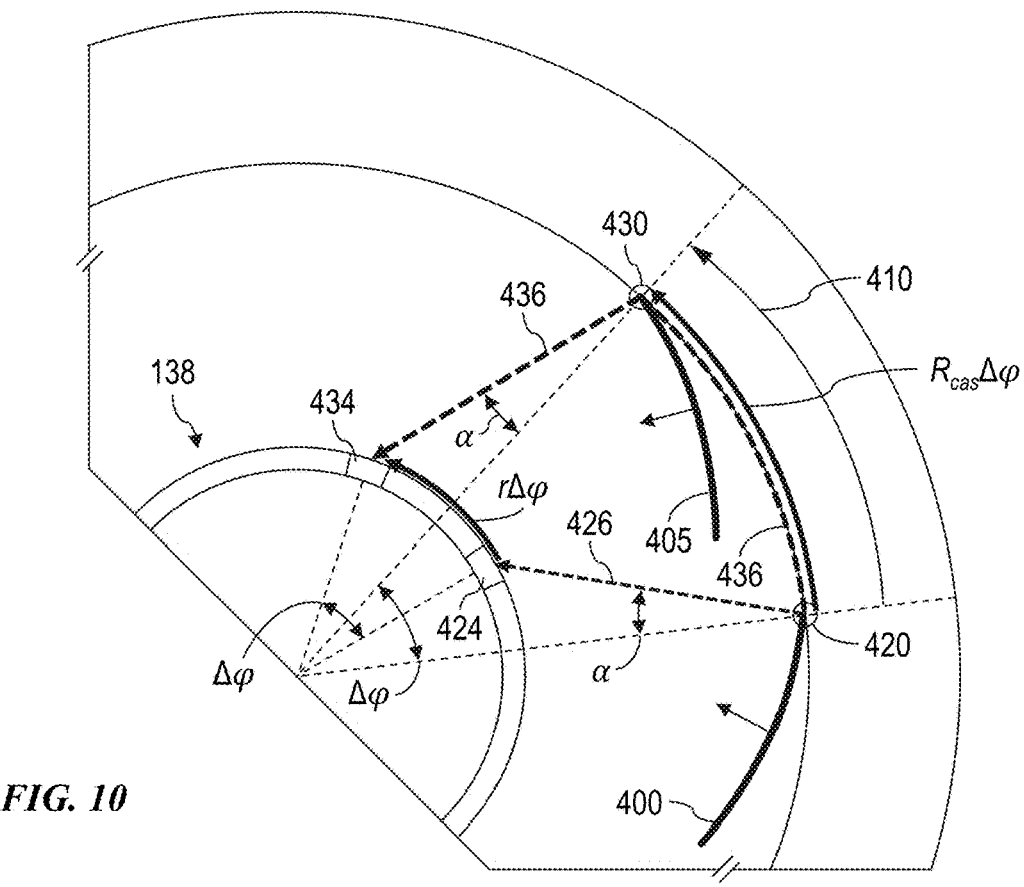
FIG. 10 is an enlarged and simplified version of a portion of FIG. 9.

FIG. 9 is a modelling snapshot of head waves 400, 405 associated with a casing guided wave 401 traveling counterclockwise, including wavefront 400 detected by the first peaks of the waveforms and wavefront 405 detected by the second peaks of the waveforms. The head waves 400, 405 are examples of the head waves 224 shown in FIG. 5. FIG. 9 is presented as a schematic of measurement of casing-guided wave velocity using head waves incident on a transducer module 138. For the purposes of the following description, it is assumed that the transducer module 138 is centered inside the casing 120 (or that a suitable eccentering compensation will be applied). FIG. 10 is another schematic illustration of some of the information shown in FIG. 9. The following description refers to FIGS. 9 and 10, collectively.

After interaction of an emitted wave with the casing, as explained in relationship with FIGS. 4 and 5, a guided wave 410 travels counterclockwise inside the casing 120 at a speed $V_{guided}$, resulting in spherical waves leaked from the casing 120 into the mud at diffraction angles α (see FIG. 10). The spherical waves are depicted as dashed-line circles for several, regularly spaced source locations along the guided wave front. For illustration purposes, the Huygens wavefronts are shown as circles around their respective source points, even though they are just considered inside the mud. Following Huygens principle, each point along the inner surface of the casing 120 becomes a source of a spherical wave. Inside the mud, the spherical waves propagate at $V_{mud}$, which is less than $V_{guided}$. Thus, during a time interval dt, the radius of a spherical wave in the mud increases as $r_{Huygens} = dt \cdot V_{mud}$.

At a certain (arbitrary) time, the guided wave 410 reaches a point 420 and begins to emit a spherical wave 422 into the mud. While the radius of the Huygens wavefront around point 420 increases in the mud as $dt \cdot V_{mud}$, the guided wave 410 continues along the casing 120 at speed $V_{guided}$. The angular distance of the guided wavefront 400 traveling between the casing 120 and the transducer module 138 during time interval dt is $Rd\varphi = dt \cdot V_{guided}$.

At some later time, the guided wavefront 210 reaches another point 430 in the casing 120. As the guided wavefront 210 traveled from point 420 to point 430, it generated spherical waves with radii proportional to the elapsed time since the guided wavefront 210 passed through the respective source point.

In this cylindrical geometry, the envelope of these spherical waves forms the curved head wave 400 stretching from point 440 to a transducer 202 at location 424 ("transducer 424"). Therefore, this snapshot corresponds to the moment in time when the transducer 424 detects the head wave 400 arriving from the guided wave 410 that passed through point 420. The signal path 426 from point 420 to transducer 424 forms the angle α relative to the casing normal in point 420, obeying Snell's law of diffraction at the critical angle, sin $\alpha = V_{mud}/V_{guided}$.

Similarly, the arrival time of the head wave 405 at a transducer 202 at location 434 ("transducer 434") can be constructed at a somewhat later time. It corresponds to a snapshot of the wavefront 405 as the guided wave 410 travelled to a point 450 and transducer 434. Thus, Δφ is the known angle between transducer 424 and transducer 434, such that the angular distance is DOT·Δφ/2, where DOT is the collective outer diameter formed by radially outward extents of each of the transducers 202. This is depicted in FIG. 10 by rΔφ, where r=DOT/2.

The second head wave snapshot 405 is equal to the first snapshot 400 at an earlier moment in time except for being rotated counterclockwise by rΔφ. The second snapshot 405 corresponds to the moment in time when transducer 434 detects the head wave 410 at the angle α relative to the casing normal in point 430.

Making a differential measurement of signal arrival times between transducer 424 and transducer 434 permits determining the guided wave speed $V_{guided}$ in the casing 120. For example, this comprises an angular velocity $V_{meas} = r\Delta\varphi/\Delta T_{meas}$, where $\Delta T_{meas}$ is the signal arrival time difference between transducer 424 and transducer 434. The time interval ΔT is given by the time difference between a path 436 (from point 420 to transducer 434 via point 430) and the path 426. The difference is thus given by Equation (5) set forth below.

$$\Delta T_{meas} = \left(\frac{R_{cas}\Delta\varphi}{V_{p,guided}} + \frac{s}{V_{mud}}\right) - \left(\frac{s}{V_{mud}}\right) = \frac{R_{cas}\Delta\varphi}{V_{p,guided}} \quad (5)$$

where $R_{cas}$ is 0.5·casing inner diameter ($ID_{cas}$), and where s is the fluid path length (i.e., 426 and 436 in FIG. 10). Equation (5) permits determining $V_{guided}$ based on the signals recorded by the phased array module, as these recordings permit obtaining $\Delta T_{meas}$. The measurement therefore yields $$V_{meas} = \frac{\Delta\varphi \cdot 0.5 \cdot DOT}{\Delta T_{meas}} = (0.5 \cdot DOT/R_{cas}) \cdot V_{guided},$$

which is the apparent velocity measured on the casing. It does not depend on $V_{mud}$. An independent determination of $R_{cas}$ may be provided by pulse-echo measurements (and/or any other means, including as disclosed herein). Note that such pulse-echo measurements entail the reception of the specular echo by the transducer that has transmitted the acoustic pulse.

In the cylindrical geometry of the casing 120, the angular velocity $V_{mode}$ of propagation of the given head wave may be as set forth below in Equation (6).

$$\frac{d\alpha}{dt} = \frac{2\pi}{T} = \frac{2\pi V_{guided}}{2\pi R_{cas}} = \frac{V_{guided}}{R_{cas}} \rightarrow V_{guided} = \frac{2\pi R_{cas}}{T} \quad (6)$$

where T is travel time of the head wave between emission and reception.

For resonance trailing trail, the corresponding resonance frequency $f_{res}$ will be approximately defined as set forth below in Equation (7).

$$f_{res} = \frac{V_p}{2th_{cas}} \quad (7)$$

With $V_p$ obtained as mentioned below from the velocity of at least one guided wave (e.g., A0 and S0), and this well-known relationship, by having one of the casing thickness and the resonance frequency, it is possible to derive the other.

Figure 11:
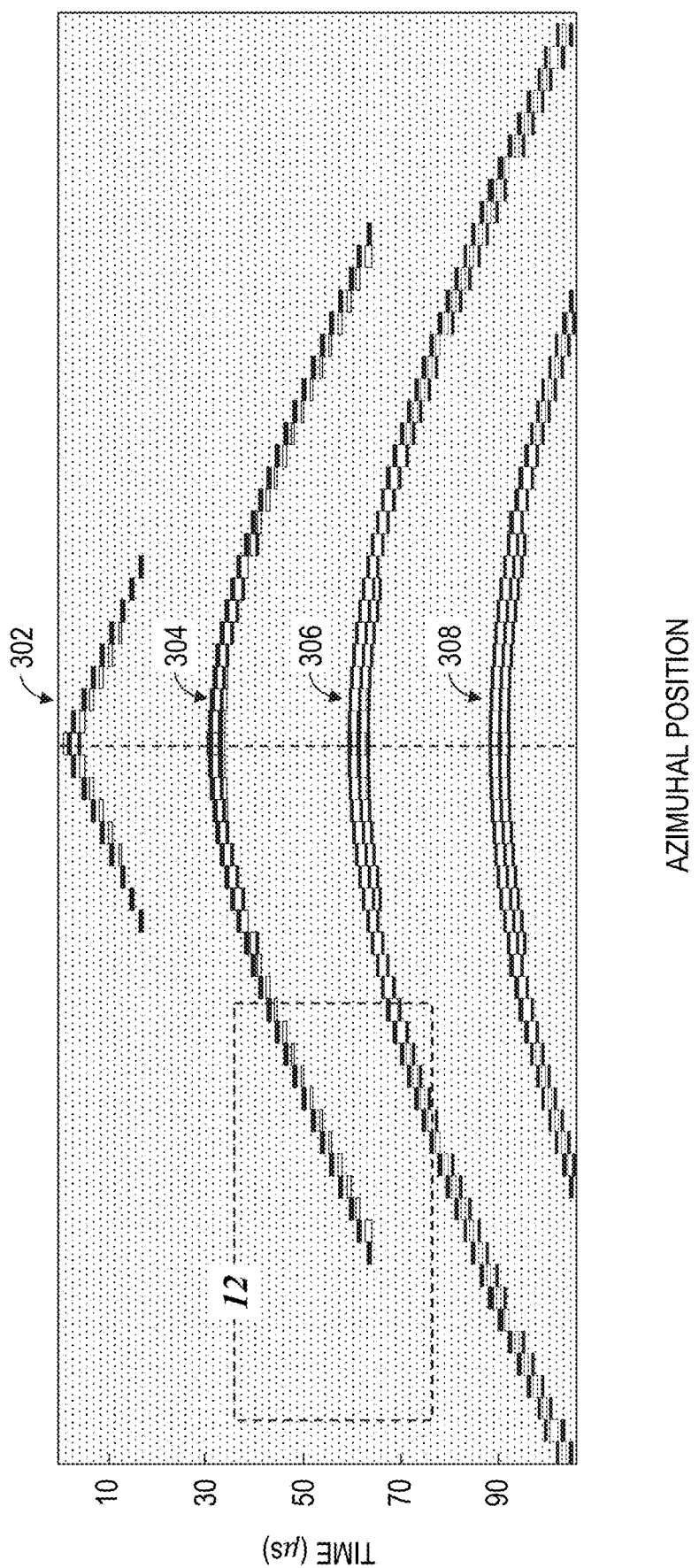
FIG. 11 is a graph depicting example waveforms sensed by a multi-element transducer module according to one or more aspects of the present disclosure.

FIG. 11 is a simulated emission scenario depicting a synthetic case of how such propagation features are recorded by a one-dimensional (1D) transducer module 138 having a plurality of transducers 202 distributed radially in a single row 204. The scenario assumes that the transducer module 138 is centered within the casing 120, $OD_{cas}$ is 11.4 centimeters (cm), $th_{cas}$ is 7.6 millimeters (mm), and the emitting transducer fires at ~3 microseconds (μs).

The chevron 302 depicts recorded data indicative of the direct pulse emission, representing the situation depicted in FIG. 3. Its angular propagation rate can roughly be estimated from the figure as being equal to dα/dt=π/58 μs, where 58 μs is representative of the time difference between the time when the direct pulse emission would reach the opposite transducer (at an angle of π from the emitting transducer) and the time of the emission of the pulse. This can be easily obtained using the slope of the chevron 302. Using Equation (3) set forth above provides an estimation of $V_{mud}$ of 1,497 meters/second (m/s), which is very near the 1,500 m/s used in the simulation.

The first specular echo 304 that reaches the emitting transducer (at the central azimuthal position) at about 30 μs is not unique and its neighbor elements also receive it. The total wave-front of the first echo 304 has a chevron pattern. Its time delay from the event of firing is defined by the mud properties, as described above, as T=2·standoff/$V_{mud}$. A secondary chevron 306 and a tertiary chevron 308 are its multiple reflections and have similar time characteristics. For example, resulting from the parameters obtained from the simulation, $V_{mud}$=1,473 m/s, which is still less than 2% off from the model-value. This result is consistent with the first estimation. On the other hand, if $V_{mud}$ was assumed to be a known value, the validity of the inner diameter value could be cross-checked.

Figure 12:
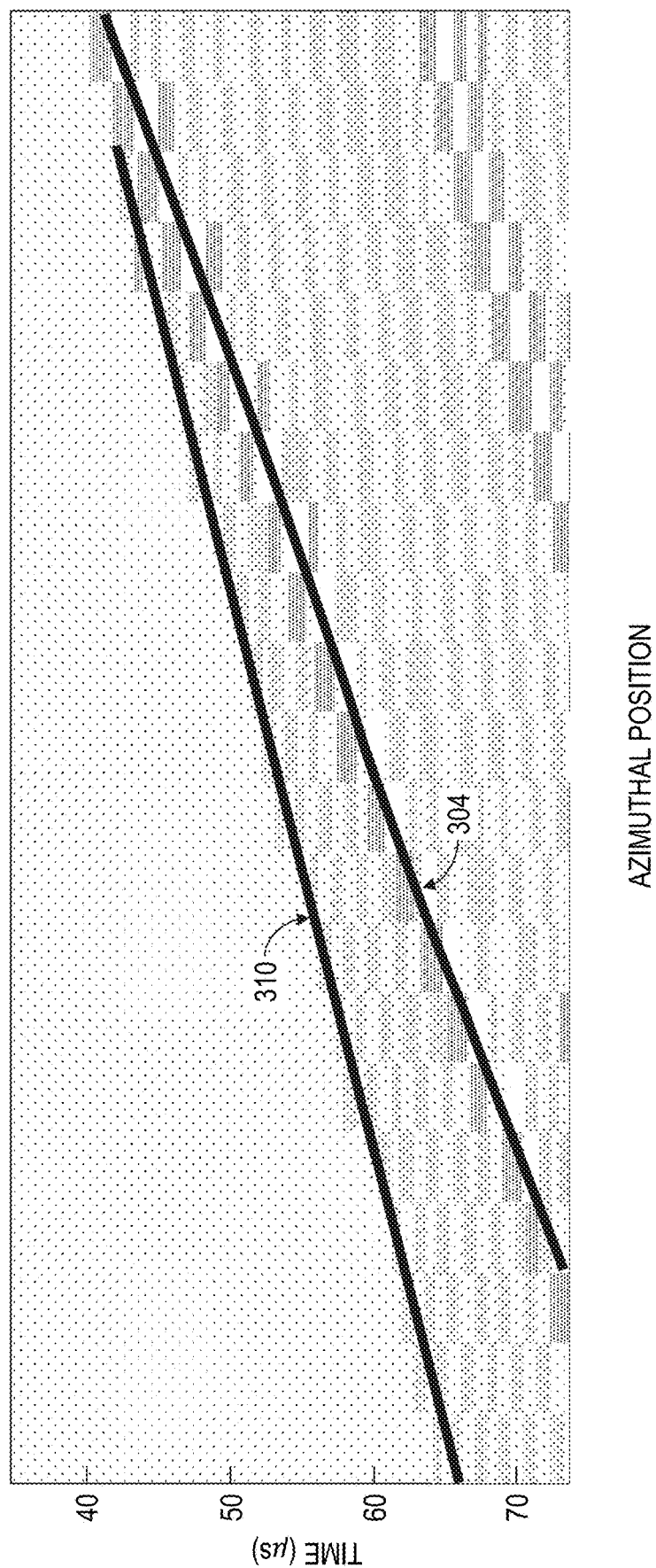
FIG. 12 is an enlarged view of a portion of FIG. 11.

FIG. 12 is an enlargement of the portion indicated in FIG. 11 with increased contrast. As shown in FIG. 12, the first head wave (indicated by line 310) can be recognized above the main wave of the first specular echo 304. The earliest arriving head wave 310 is due to the extensional S0 mode leaking from the casing 120, as described above with respect to the head waves 224 depicted in FIG. 5. The slope of the head wave 310 can be roughly estimated from FIG. 12 as being equal to dα/dt=π/29 μs, where 29 μs is representative of the time difference between the time when the direct pulse emission would reach the opposite transducer (at an angle of π from the emitting transducer) and the time of the emission of the pulse. According to Equation (6) set forth above, this results in $V_{guidedS0}$=5,775 m/s, which agrees well with the casing compression bulk speed of 5,900 m/s used as input in the simulation. Using this value and the resonance frequency analysis, the thickness of the casing 120 can be determined as 7.6 mm, which agrees with input value.

Figure 13:
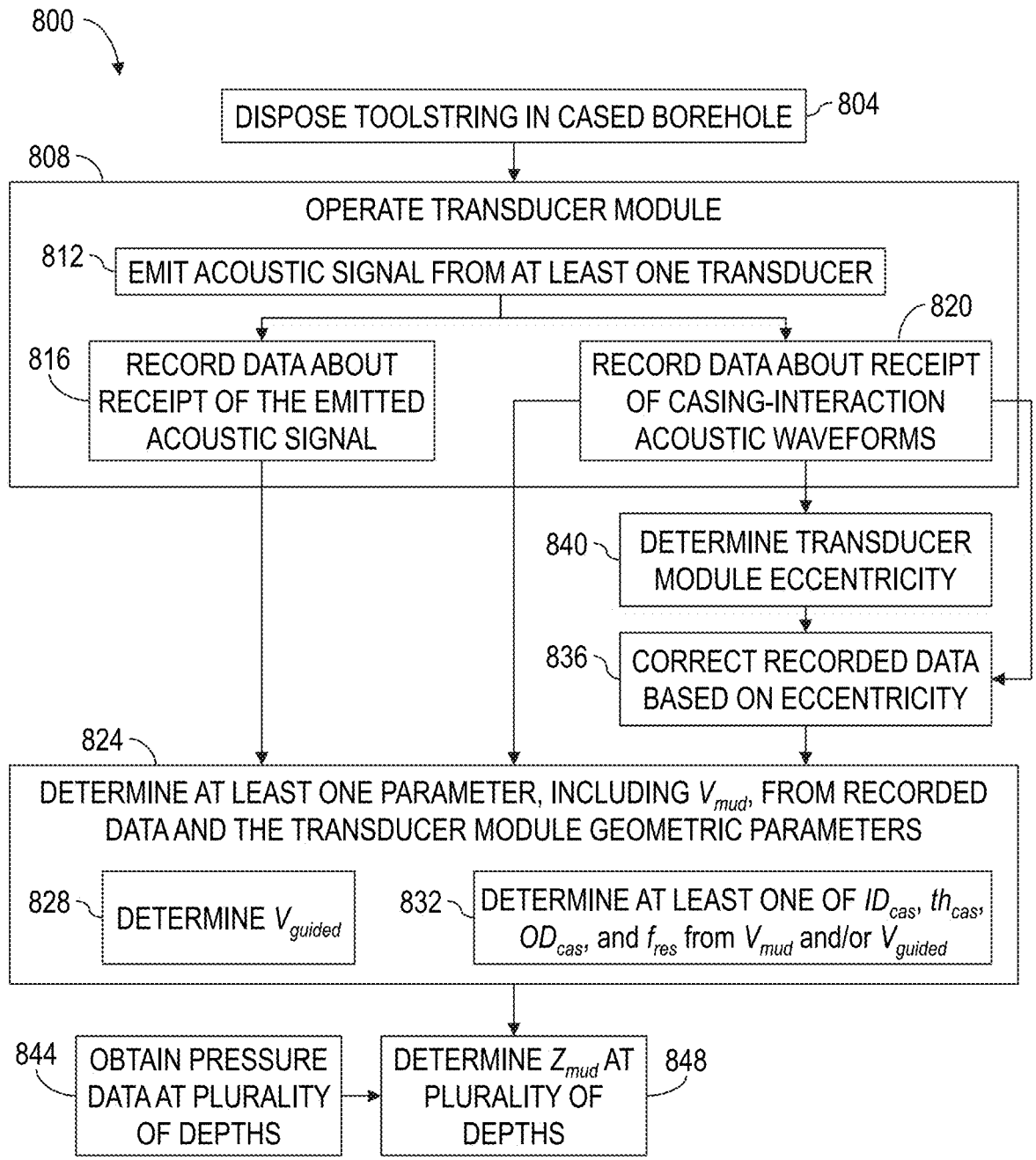
FIG. 13 is a flow-chart view of at least a portion of an example implementation of a method according to one or more aspects of the present disclosure.

An array processing adapted to the simulated cylindrical geometry can enhance the sensitivity to the non-specular head waves 224 originating from the fast extensional S0 mode and the slower flexural A0 mode. To this end, appropriate windowing in time and space (set of sensor elements) can be chosen to limit the effects of undesired specular reflections arriving at a given sensor. Furthermore, known and/or future-developed array processing algorithms for the waveform dispersion analysis in borehole acoustic arrays can be adapted to the present cylindrical geometry (e.g., linear sensor spacings replaced by azimuthal sensor spacings). Based on this array processing, $V_{guidedS0}$ (velocity of the guided wave of the extensional S0 mode) and $V_{guidedA0}$ (velocity of the flexural A0 mode) may be determined and used as described above. FIG. 13 is a flow-chart diagram of at least a portion of an example implementation of a method 800 of automatic recognition of environmental parameters utilizing a transducer module according to one or more aspects of the present disclosure. The method 800 comprises disposing 804 a toolstring 104 in a cased portion 150 of a borehole 108 penetrating a subsurface formation 124. The toolstring 104 comprises a transducer module 138 comprising a plurality of acoustic transducers 202 each operable to emit and receive acoustic signals.

The method 800 also comprises operating 808 the transducer module 138, such as to emit 812 an acoustic signal 212 from at least one of the transducers 202 (e.g., the single transducer 210 in FIG. 3) into the fluid surrounding the transducer module 138 in the casing 120. Operating 808 the transducer module 138 also comprises recording 816 data indicative of receipt by at least one of the transducers of the emitted 812 acoustic signal 212 (such as depicted in FIG. 3 and by the signal receptions 302 shown in FIG. 11), recording 820 data indicative of receipt by at least one of the transducers of acoustic waveforms (220 and/or 224) resulting from interaction of the emitted 812 acoustic signal 212 with the casing 120 (such as depicted in FIG. 4 and by the signal receptions 304 shown in FIG. 11 or the signal receptions 310 shown in FIG. 12), or both (i.e., data recording 816 and data recording 820).

The method 800 also comprises determining 824 at least one parameter utilizing the recorded (816 and/or 820) data and geometric parameters of the transducer module. Determining 824 the at least one parameter includes determining $V_{mud}$.

For example, the recorded 816 data may be indicative of the receipt of the emitted 812 acoustic signal 212 by at least one of the transducers, and determining 824 the at least one parameter may comprise determining $V_{mud}$ utilizing:
 a. from the recorded 816 data, one or more arrival times of the emitted acoustic signal at one or more of the transducers (e.g., the arrival times 302 in FIG. 11); and
 b. from the geometric parameters of the transducer module:
  i. azimuthal offsets of each transducer relative to:
   1. each other one of the transducers; or
   2. the at least one transducer from which the emitted acoustic signal was emitted 812; and
  ii. DOT.

As another example, the recorded data 820 may be indicative of the receipt, by at least two of the transducers, of the non-specular diffraction head wave 224 excited by the guided wave 222 that is excited by diffraction of the emitted acoustic signal 212 propagating in the casing 120, and determining 824 the at least one parameter may additionally comprise determining 828 a velocity ($V_{guided}$ of the guided wave 222 utilizing:
 a. from the recorded 820 data, arrival times of the head wave 224 at each of the transducers (e.g., the arrival times indicated by 310 in FIG. 11); and
 b. from the geometric parameters of the transducer module:
  i. azimuthal offsets of each transducer relative to:
   1. each other one of the transducers; or
   2. the at least one transducer from which the emitted acoustic signal was emitted 812; and
  ii. DOT.

In such implementations (among others also within the scope of the present disclosure), the guided wave 222 may be an extensional wave, a flexural wave, or both. Determining $V_{guided}$ may further utilize $V_{mud}$ and/or an internal diameter of the casing 120 ($ID_{cas}$).

In either of the above examples, determining 824 the at least one parameter may additionally comprise utilizing at least one of the determined 824 $V_{mud}$ and/or the determined 828 $V_{guided}$ to determine 832 at least one of $ID_{cas}$, $th_{cas}$, $OD_{cas}$, and $f_{res}$.

The method 800 may also comprise correcting 836 the recorded 820 data to account for eccentricity of the transducer module 138 within the casing 120, such that determining 824 the at least one parameter may utilize the corrected 840 data. For example, the at least one parameter may be determined 824 utilizing just the corrected 836 data and the geometric parameters of the transducer module 138.

In such implementations (among others also within the scope of the present disclosure), one of the acoustic waveforms indicated by the recorded 820 data may be a specular wave 220 resulting from the emitted 812 acoustic signal 212 reflecting from the inner surface of the casing 120 (e.g., the arrival times indicated by 304 in FIG. 11), the recorded 820 data may be indicative of the receipt of the specular wave 220 by at least three of the transducers, and the method 800 may further comprise determining 840 the eccentricity of the transducer module 138 within the casing 120 utilizing just:

a. from the geometric parameters of the transducer module:
   i. DOT; and
   ii. azimuthal offsets of the at least three transducers; and
b. from the recorded data, arrival times of the specular wave 220 at each of the at least three transducers.

An implementation of the eccentricity correction method is described in more detail in relationship with FIGS. 11 and 12 of the EP Patent Application No. EP20305113.1, entitled "Real-Time Reconfiguration of Phased Array Operation," and filed on Feb. 6, 2020, the entirety of which is hereby incorporated herein by reference.

Figure 14:
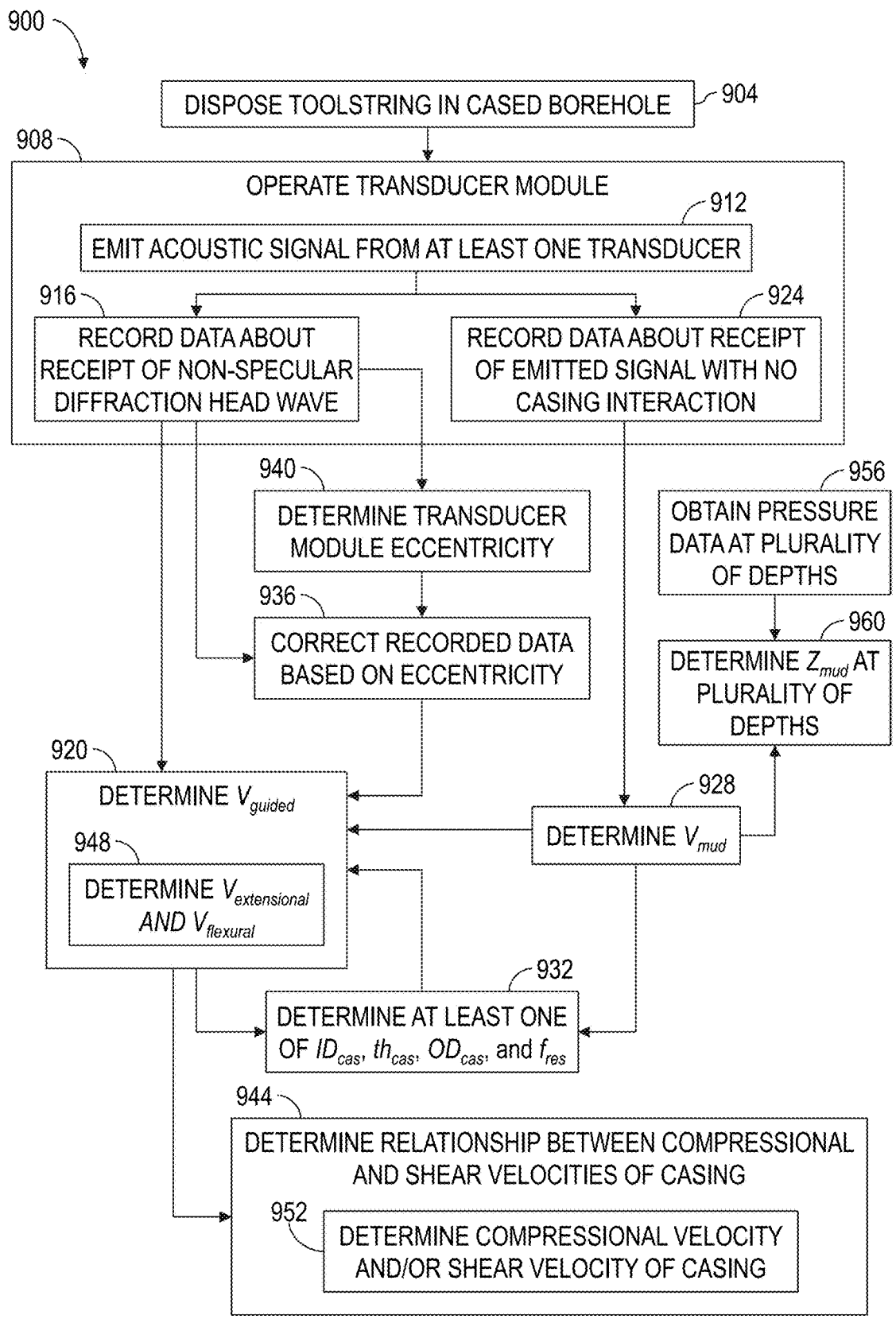
FIG. 14 is a flow-chart view of at least a portion of another example implementation of a method according to one or more aspects of the present disclosure.

FIG. 14 is a flow-chart diagram of at least a portion of another example implementation of a method 900 of automatic recognition of environmental parameters utilizing a transducer module according to one or more aspects of the present disclosure. The method 900 comprises disposing 904 a toolstring 104 in a cased portion 150 of a borehole 108 penetrating a subsurface formation 124. The toolstring 104 comprises a transducer module 138 comprising a plurality of acoustic transducers 202 each operable to emit and receive acoustic signals.

The method 900 also comprises operating 908 the transducer module 138 to emit 912 an acoustic signal 212, from at least one of the transducers 202 (e.g., the single transducer 210 shown in FIG. 3), into fluid surrounding the transducer module 138 in the casing 120. Operating 908 the transducer module 138 also comprises recording 916 data indicative of the receipt, by a plurality of the transducers 202, of acoustic waveforms resulting from interaction of the emitted 912 acoustic signal 212 with the casing 120 (such as depicted by the signal receptions 304 shown in FIG. 11), including at least a non-specular diffraction head wave 224 excited by a guided wave 222 that is excited by diffraction of the acoustic signal 212 propagating in the casing 120 (such as depicted by the signal receptions 310 shown in FIG. 12).

The method 900 also comprises determining 920 acoustic velocity of the guided wave 222 in the casing 120 ($V_{guided}$) utilizing the recorded 916 data and geometric parameters of the transducer module 138. The guided wave 222 may be an extensional wave, a flexural wave, or both.

The method 900 may further comprise recording 924 data indicative of the receipt, by one or more of the transducers 202, of the emitted 912 acoustic signal 212 before the emitted acoustic signal impinges on the casing 120 (i.e., not a "casing-interaction" acoustic waveform), and determining 928 $V_{mud}$ utilizing the recorded 924 data. Determining 928 $V_{mud}$ may utilize just:

a. from the recorded 924 data, one or more arrival times of the emitted 912 acoustic signal 212 at the one or more transducers 202 (e.g., the arrival times 302 in FIG. 11); and
b. from the geometric parameters of the transducer module 138:
   i. azimuthal offsets of each transducer 202 relative to:
      1. each other one of the transducers 202; or
      2. the at least one transducer 202 from which the emitted 912 acoustic signal 212 was emitted; and
   ii. DOT.

Determining 920 $V_{guided}$ may utilize:
a. from the recorded 916 data, arrival times of the head wave 224 at two or more of the transducers 202; and
b. from the geometric parameters of the transducer module 138:
   i. azimuthal offsets of each transducer 202 relative to the at least one transducer 202 from which the emitted 912 acoustic signal 212 was emitted; and
   ii. DOT.

The method 900 may further comprise utilizing at least one of the determined 928 $V_{mud}$ or the determined 920 $V_{guided}$ to determine 932 at least one of $ID_{cas}$, $th_{cas}$, $OD_{cas}$, and $f_{res}$. Determining 920 $V_{guided}$ may further utilize the determined 928 $V_{mud}$ and/or the determined 932 $ID_{cas}$ (or estimates therefor).

The method 900 may further comprise correcting 936 the recorded 916 data to account for eccentricity of the transducer module 138 within the casing 120. Thus, determining 920 $V_{guided}$ may utilize the corrected 936 data instead of the recorded 916 data. In such implementations (among others also within the scope of the present disclosure), the recorded 916 data may also be indicative of the receipt of the specular wave 220 by at least three of the transducers 202, and the method 900 may further comprise determining 940 the eccentering of the transducer module 138 within the casing 120 utilizing just:

a. from the geometric parameters of the transducer module:
   i. DOT; and
   ii. azimuthal offsets of the at least three transducers 202; and
b. from the recorded 916 data, arrival times of the specular wave 220 at each of the at least three transducers 202.

As mentioned above, an implementation of the eccentricity correction method is described in more detail in relationship with FIGS. 11 and 12 of the EP Patent Application No. EP20305113.1, entitled "Real-Time Reconfiguration of Phased Array Operation," and filed on Feb. 6, 2020.

The method 900 may also comprise utilizing the determined 920 $V_{guided}$ to determine 944 a relationship between compressional and shear velocities of the casing 120. For example, the guided wave 222 may comprise an extensional wave and a flexural wave, determining 920 $V_{guided}$ may comprise determining 948 acoustic velocity of the extensional wave ($V_{extensional}$) and the flexural wave ($V_{flexural}$) in the casing 120 utilizing the recorded 916 data (or the corrected 936 data) and the geometric parameters of the transducer module, and determining 944 the relationship between the compressional and shear velocities of the casing 120 may comprise determining 952 the compressional and shear velocities of the casing 120 utilizing $V_{extensional}$ and $V_{flexural}$.

The emitted 912 acoustic signal 212 may comprise a plurality of frequencies, such that determining 920 $V_{guided}$ may utilize ones of the received acoustic waveforms corresponding to at least two of the frequencies. For example, the guided wave 222 may comprise an extensional wave and a flexural wave, determining 920 $V_{guided}$ may comprise determining, at each of the at least two of the frequencies, at least one of $V_{extensional}$ and $V_{flexural}$ utilizing the recorded 916 data (or the corrected 936 data) and the geometric parameters of the transducer module 138, and the method 900 may comprise determining at least one compressional velocity and shear velocity of the casing 120 utilizing a predetermined dispersion curve and at least one of $V_{extensional}$ and $V_{flexural}$ at each of the at least two of the frequencies.

In view of the above, a person having ordinary skill in the art will readily recognize that the present disclosure introduces using a single firing pulse of a transducer module, the full response recorded by each transducer, and the relations exemplified in Equations (1)-(6), to determine $V_{mud}$ (or the inverse, mud slowness), $V_{guided}$ in the casing, and geometric parameters of the casing (e.g., $th_{cas}$ and $OD_{cas}$), without knowing other parameters. Furthermore, by means of appropriate windowing in time and sensor-space (to limit the effects of undesired specular reflections) and by using a cylindrical array-processing algorithm (i.e., linear sensor spacings are replaced by azimuthal sensor spacings), the casing dispersion relation of extensional S0 and flexural A0 leaky Lamb modes (and potentially of Scholte surface modes) can be derived in the bandwidth given by the sensor excitation spectrum. From the dispersion relation of extensional S0 and flexural A0 leaky Lamb modes, the underlying bulk shear and compressional speeds $V_s$ and $V_p$ and the Poisson ratio of the casing (obtained as a function of $V_s$ and $V_p$) can be uniquely determined to enhance the accuracy of such determinations. Consequently, one or more aspects of the methods and apparatus described herein may permit downhole acoustic techniques that extract the described parameters in real-time with no input from field engineers.

Moreover, aspects of the methods and apparatus described above may be utilized as a basis for subsequent answer products. For example, mud acoustic impedance ($Z_{mud}$) may be determined based on the $V_{mud}$ determined, for example, according to one or more aspects described above and/or by other known or future-developed means. $Z_{mud}$ may be utilized in well integrity applications (among others), including in association with ultrasonic imaging tools and other examples where inversion and/or other signal analysis strongly dependent upon $Z_{mud}$.

For example, some pulse-echo processing is highly dependent on $Z_{mud}$ to produce accurate results, notably of the impedance-behind-casing measurement (e.g., cement bond). To solve this dependency, a "free-pipe normalization" may be utilized, in which a known pipe section filled with a known fluid, such as water, is used to fine tune the $Z_{mud}$ input value so that the output of the inversion produces the expected result. However, while such an approach is utile for implementations in which $Z_{mud}$ is constant for an entire log, there are other implementations in which the mud distribution with depth is not homogeneous, such that $Z_{mud}$ varies with respect to depth.

In such non-homogeneous scenarios, the slowness information extracted from ultrasonic travel time can be used based on the dependency set forth below in Equation (8).

$$Z_{mud} = \rho V_{mud} \tag{8}$$

However, this information may not be sufficient where both $V_{mud}$ and the fluid density $\rho$ change simultaneously. In such situations (among others), the density information can be determined utilizing one or more pressure or differential pressure sensors 137 (see FIG. 1) carried with the toolstring 104, utilizing Equation (9) set forth below.

$$\Delta p = \mu g \Delta h \tag{9}$$

where p is pressure, h is true vertical depth (as opposed to axial position with the wellbore 108), g is gravity, $\rho$ is density of the fluid (mud) in the casing 120, $\Delta h$ is the difference between the depths of two measurements by the sensor(s) 137, and $\Delta p$ is the difference between the pressures measured by the sensor(s) 137 at the two depths.

In differential form, Equation (9) produces Equation (10) set forth below, demonstrating that $\rho$ is proportional to the slope of p as a function of h.

$$\rho(h) = \frac{1}{g} \cdot \frac{dp}{dh} \tag{10}$$

Combining Equations (8) and (10) results in Equation (11) set forth below.

$$Z_{mud}(h) = \frac{1}{g} \cdot \frac{dp(h)}{dh} \cdot V_{mud}(h) \tag{11}$$

Thus, by determining $V_{mud}$ according to one or more aspects described above, and by also measuring pressure within the casing 120, a direct measurement of $Z_{mud}$ may be obtained. For example, returning to FIG. 13, the method 800 may also comprise obtaining 844 one or more pressure/differential pressure measurements (e.g., via sensor(s) 137 of the toolstring 104 disposed 804 in the cased borehole portion 150) at a plurality of depths within the cased borehole portion 150. Thereafter, $Z_{mud}$ may be determined 848 utilizing the determined 824 $V_{mud}$ and the obtained 844 pressure measurements.

Similarly, with respect to FIG. 14, the method 900 may also comprise obtaining 956 one or more pressure/differential pressure measurements (e.g., via sensor(s) 137 of the toolstring 104 disposed 904 in the cased borehole portion 150) at a plurality of depths within the cased borehole portion 150. Thereafter, $Z_{mud}$ may be determined 960 at the plurality of depths utilizing the determined 928 $V_{mud}$ and the obtained 956 pressure measurements.

It is to be noted that when the fluid in the borehole is non-homogeneous, zones may be determined based on the fluid interface, and $V_{mud}$ and $\rho$ may be determined for the entirety of each zone based on pressure and acoustic measurements obtained in that zone. Therefore, $Z_{mud}$ may be obtained for an entire fluid zone based on two pressure measurements and one acoustic measurement. However, in order to strengthen the estimation of the density and $V_{mud}$, more pressure and acoustic measurements may be taken, and the estimation may be obtained based on the higher number of measurements, such as by averaging the different values of the parameters.

It is also to be noted that $Z_{mud}$ may be obtained based on the pressure measurements and the $V_{mud}$ obtained by other means, not just the methods described above. For example, $V_{mud}$ values may be pre-defined values entered by a user or measured with other configurations of the tool, such as an acoustic sensor that does not comprise a plurality of transducers and/or a transducer module.

Figure 15:
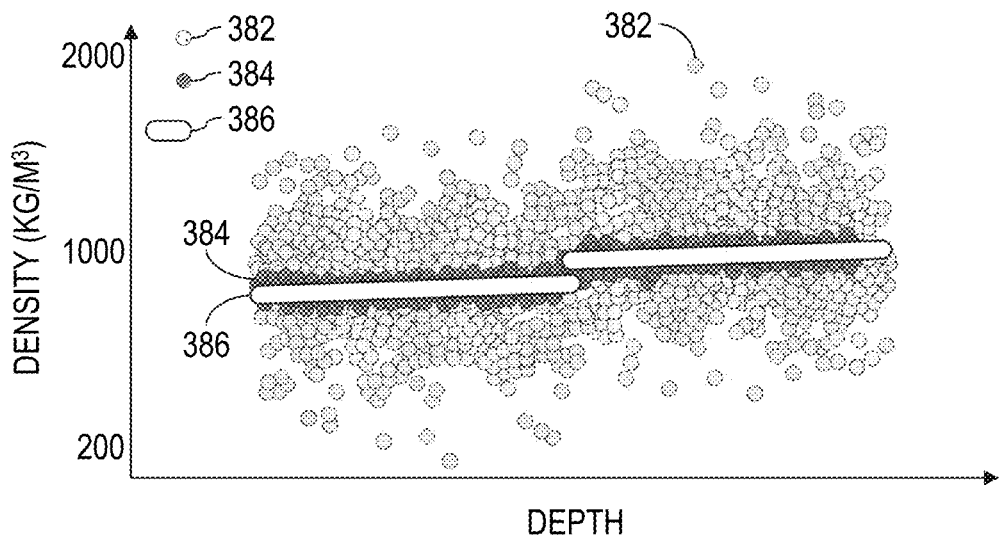
FIGS. 15 and 16 are graphs each depicting one or more aspects of the present disclosure.
Figure 16:
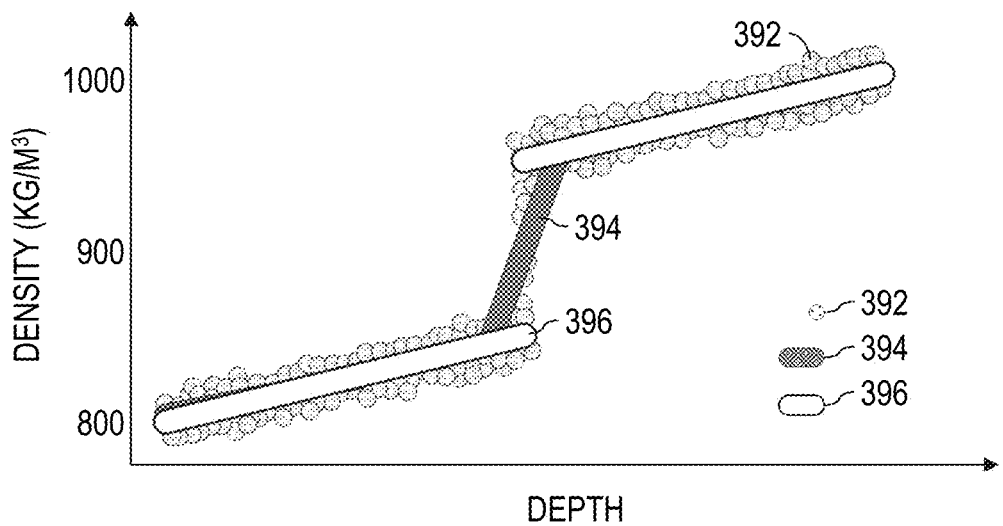

In implementations in which the sensor 137 utilized to obtain 844/956 pressure measurements is an absolute pressure sensor, the achievable resolution on the density measurement is a tradeoff between the pressure resolution of the pressure sensor 137, the spatial resolution of the density measurement, and the logging speed. FIG. 15 is a graph depicting an example implementation in which the toolstring 104 includes ultrasonic pulse-echo measurement means and a downhole pressure sensor with a resolution of 700 Pascals (0.1 pounds per square inch, psi) at a gate time of one second, in which pressure and $V_{mud}$ are sampled at intervals of one meter. The graph includes data points 382 representing density averaged over intervals of 10 seconds, data points 384 representing density averaged over intervals of 100 seconds, and the actual density 386. Equation (10) produces a minimum density resolution of about 50 kilograms per cubic meter (kg/m³), or 5%, if measuring water. However, FIG. 16 is a graph depicting a similar example implementation where the downhole pressure sensor has a resolution of 35 Pascals (0.005 psi) at a gate time of one second (such as a micro-electromechanical system (MEMS) silicon-on-insulator (SOI) sensor), permitting measuring density with a precision of 1 kg/m³ and below. In FIG. 16, data points 392 representing density averaged over intervals of 10 seconds, data points 394 representing density averaged over intervals of 100 seconds, and the actual density 396.

Figure 17:
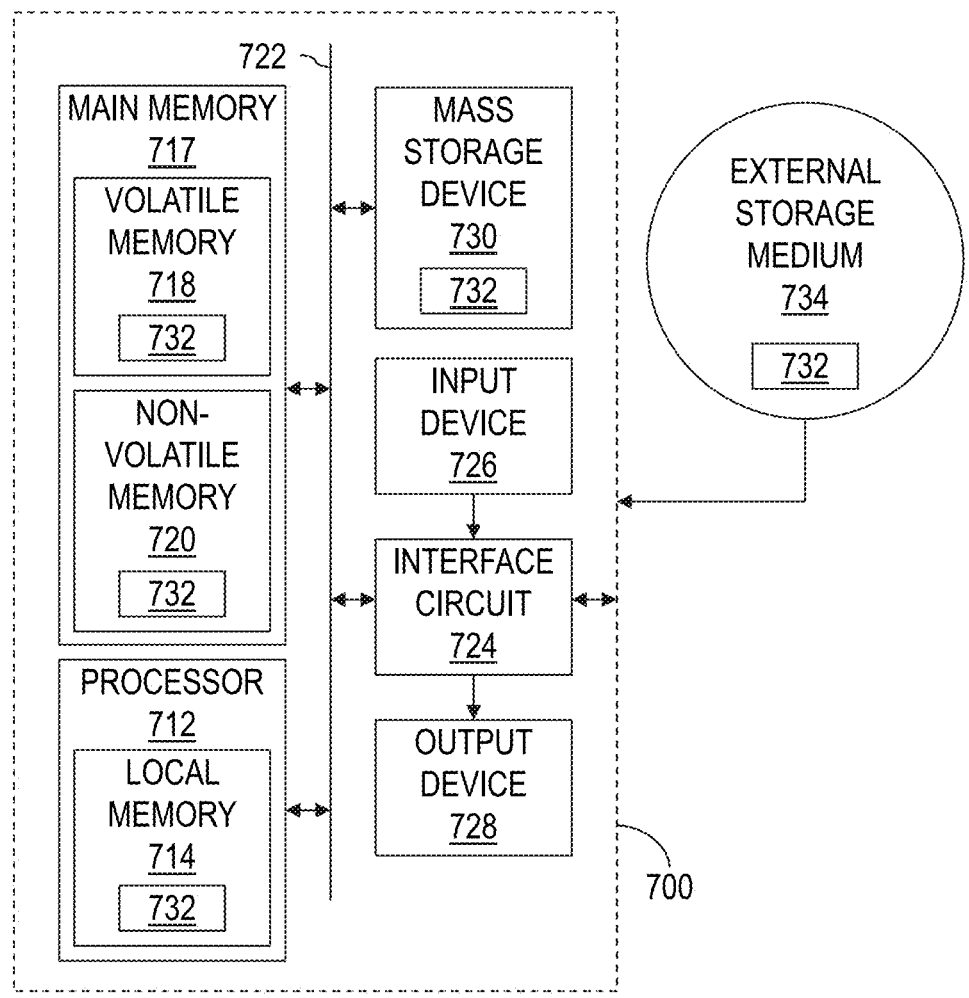
FIG. 17 is a schematic view of at least a portion of an example implementation of a processing system according to one or more aspects of the present disclosure.

FIG. 17 is a schematic view of at least a portion of an example implementation of a processing system 700 according to one or more aspects of the present disclosure. The processing system 700 may execute machine-readable instructions to implement at least a portion of one or more of the methods and/or processes described herein, and/or to implement a portion of one or more of the example downhole tools and/or surface equipment described herein. The processing system 700 may be or comprise, for example, one or more processors, controllers, special-purpose computing devices, servers, personal computers, personal digital assistant (PDA) devices, smartphones, internet appliances, and/or other types of computing devices. The entirety of the processing system 700 may be implemented within downhole apparatus described above. One or more components or functions of the processing system 700 may also or instead be implemented in wellsite surface equipment, perhaps including the surface equipment 132 depicted in FIG. 1 and/or other surface equipment.

The processing system 700 may comprise a processor 712, such as a general-purpose programmable processor, among other examples. The processor 712 may comprise a local memory 714 and may execute program code instructions 732 present in the local memory 714 and/or another memory device. The processor 712 may execute, among other things, machine-readable instructions or programs to implement the methods and/or processes described herein. The programs stored in the local memory 714 may include program instructions or computer program code that, when executed by an associated processor, cause a controller and/or control system implemented in surface equipment and/or a downhole tool to perform tasks as described herein. The processor 712 may be, comprise, or be implemented by one or more processors of various types operable in the local application environment, and may include one or more general-purpose processors, special-purpose processors, microprocessors, digital signal processors (DSPs), field programmable gate arrays (FPGAs), application-specific integrated circuits (ASICs), processors based on a multi-core processor architecture, and/or other processors.

The processor 712 may be in communication with a main memory 717, such as via a bus 722 and/or other communication means. The main memory 717 may comprise a volatile memory 718 and a non-volatile memory 720. The volatile memory 718 may be, comprise, or be implemented by random access memory (RAM), static RAM (SRAM), dynamic RAM (DRAM), synchronous DRAM (SDRAM), RAMBUS DRAM (RDRAM), and/or other types of RAM devices. The non-volatile memory 720 may be, comprise, or be implemented by read-only memory, flash memory, and/or other types of memory devices. One or more memory controllers (not shown) may control access to the volatile memory 718 and/or the non-volatile memory 720.

The processing system 700 may also comprise an interface circuit 724. The interface circuit 724 may be, comprise, or be implemented by various types of standard interfaces, such as an Ethernet interface, a universal serial bus (USB), a wireless interface, and/or a cellular interface, among other examples. The interface circuit 724 may also comprise a graphics driver card. The interface circuit 724 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 726 may be connected to the interface circuit 724. One or more of the input devices 726 may permit a user to enter data and/or commands for utilization by the processor 712. Each input device 726 may be, comprise, or be implemented by a keyboard, a mouse, a touchscreen, a trackpad, a trackball, an image/code scanner, and/or a voice recognition system, among other examples.

One or more output devices 728 may also be connected to the interface circuit 724. One or more of the output devices 728 may be, comprise, or be implemented by a display device, such as a liquid crystal display (LCD), a light-emitting diode (LED) display, and/or a cathode ray tube (CRT) display, among other examples. One or more of the output devices 728 may also or instead be, comprise, or be implemented by a printer, speaker, and/or other examples.

The processing system 700 may also comprise a mass storage device 730 for storing machine-readable instructions and data. The mass storage device 730 may be connected to the interface circuit 724, such as via the bus 722. The mass storage device 730 may be or comprise a floppy disk drive, a hard disk drive, a compact disk (CD) drive, and/or digital versatile disk (DVD) drive, among other examples. The program code instructions 732 may be stored in the mass storage device 730, the volatile memory 718, the non-volatile memory 720, the local memory 714, and/or on a removable storage medium 734, such as a CD or DVD.

The mass storage device 730, the volatile memory 718, the non-volatile memory 720, the local memory 714, and/or the removable storage medium 734 may each be a tangible, non-transitory storage medium. The modules and/or other components of the processing system 700 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces a method comprising: (A) disposing a toolstring in a cased portion of a borehole penetrating a subsurface formation, wherein the cased borehole portion comprises a casing, and wherein the toolstring comprises a module comprising a plurality of acoustic transducers distributed azimuthally around the toolstring and each operable to emit and receive acoustic signals; (B) operating the module to: (1) emit an acoustic signal, from at least one of the transducers, into fluid surrounding the module in the casing; and (2) record data indicative of receipt by at least one of the transducers of the emitted acoustic signal; and (C) determining at least one parameter utilizing the recorded data and geometric parameters of the module, wherein the at least one determined parameter includes acoustic velocity of the fluid ($V_{mud}$).

The module may be a phased array module, such that the transducers may be collectively operated by an electronics module that permits generating a beam that can be swept electronically.

Determining the at least one parameter may comprise determining $V_{mud}$ utilizing: (A) from the recorded data, one or more arrival times of the emitted acoustic signal at one or more of the plurality of transducers; and (B) from the geometric parameters of the module: (1) azimuthal offsets of each of the plurality of transducers relative to: (a) each other one of the plurality of transducers; or (b) the at least one transducer from which the emitted acoustic signal was emitted; and (2) a collective outer diameter formed by radially outward extents of each of the plurality of transducers (DOT).

Operating the module may also comprise recording data indicative of receipt by at least one of the transducers of acoustic waveforms resulting from interaction of the emitted acoustic signal with the casing. For example, the recorded data may be indicative of receipt, by at least two of the plurality of transducers, of a non-specular diffraction head wave excited by a guided wave that is excited by diffraction of the emitted acoustic signal propagating in the casing. In such implementations, among others within the scope of the present disclosure, determining the at least one parameter may additionally comprise determining a velocity of the guided wave ($V_{guided}$) and determining $V_{guided}$ may utilize: (A) from the recorded data, arrival times of the head wave at each of the plurality of transducers; and (B) from the geometric parameters of the module: (1) azimuthal offsets of each of the plurality of transducers relative to: (a) each other one of the plurality of transducers; or (b) the at least one transducer from which the emitted acoustic signal was emitted; and (2) a collective outer diameter formed by radially outward extents of each of the plurality of transducers (DOT). The guided wave may be an extensional wave and/or a flexural wave. Determining $V_{guided}$ may further utilize $V_{mud}$ and/or an internal diameter of the casing ($ID_{cas}$). The method may further comprise utilizing at least one of the determined $V_{mud}$ or $V_{guided}$ to determine at least one of $ID_{cas}$, a wall thickness of the casing ($th_{cas}$), an outer diameter of the casing ($OD_{cas}$), and a resonance frequency of the casing ($f_{res}$).

The method may further comprise correcting the recorded data to account for eccentricity of the module within the casing, wherein the at least one parameter may be determined utilizing the corrected data. The at least one parameter may be determined utilizing just the corrected data and the geometric parameters of the module. For example, operating the module may also comprise recording data indicative of receipt by at least one of the transducers of acoustic waveforms resulting from interaction of the emitted acoustic signal with the casing, one of the acoustic waveforms may be a specular wave resulting from the emitted acoustic signal reflecting from an inner surface of the casing, and the recorded data may also be indicative of receipt of the specular wave by at least three of the plurality of transducers. In such implementations, among others within the scope of the present disclosure, the method may further comprise determining the eccentricity of the module within the casing utilizing just: (A) from the geometric parameters of the module: (1) a collective outer diameter formed by radially outward extents of each of the plurality of transducers (DOT); and (2) azimuthal offsets of the at least three of the plurality of transducers; and (B) from the recorded data, arrival times of the specular wave at each of the at least three of the plurality of transducers.

The toolstring may comprise a pressure sensor for obtaining pressure measurements of the fluid at a plurality of depths in the cased borehole portion, determining the at least one parameter may comprise determining $V_{mud}$ at each of the plurality of depths, and the method may further comprise determining acoustic impedance of the fluid at each of the plurality of depths utilizing the pressure measurements and the determined $V_{mud}$ at each of the plurality of depths.

The present disclosure also introduces a method comprising: (A) disposing a toolstring in a cased portion of a borehole penetrating a subsurface formation, wherein the cased borehole portion comprises a metal casing, and wherein the toolstring comprises a module comprising a plurality of acoustic transducers distributed azimuthally around the toolstring and each operable to emit and receive acoustic signals; (B) operating the module to: (1) emit an acoustic signal, from at least one of the transducers, into fluid surrounding the module in the casing; and (2) record data indicative of receipt, by a plurality of the transducers, of acoustic waveforms resulting from interaction of the emitted acoustic signal with the casing, including at least a non-specular diffraction head wave excited by a guided wave that is excited by diffraction of the acoustic signal propagating in the casing metal; and (C) determining acoustic velocity of the guided wave in the casing metal ($V_{guided}$) utilizing the recorded data and geometric parameters of the module.

The module may be a phased array module, such that the transducers may be collectively operated by an electronics module that permits generating a beam that can be swept electronically.

The guided wave may be an extensional wave and/or a flexural wave.

The recorded data may be first data and the method may further comprise: recording second data indicative of receipt, by one or more of the transducers, of the emitted acoustic signal; and determining acoustic velocity of the fluid ($V_{mud}$) utilizing the second data. Determining $V_{mud}$ may utilize: (A) from the second data, one or more arrival times of the emitted acoustic signal at the one or more transducers; and (B) from the geometric parameters of the module: (1) azimuthal offsets of each of the plurality of transducers relative to: (a) each other one of the plurality of transducers; or (b) the at least one transducer from which the emitted acoustic signal was emitted; and (2) a collective outer diameter formed by radially outward extents of each of the plurality of transducers (DOT). The toolstring may comprise a pressure sensor for obtaining pressure measurements of the fluid at a plurality of depths in the cased borehole portion, and the method may further comprise determining acoustic impedance of the fluid utilizing the pressure measurements and the determined $V_{mud}$. The method may further comprise utilizing at least one of the determined $V_{mud}$ or $V_{guided}$ to determine at least one of $ID_{cas}$, $th_{cas}$, $OD_{cas}$, and $f_{res}$.

Determining $V_{guided}$ may utilize: (A) from the recorded data, arrival times of the head wave at two or more of the plurality of transducers; and (B) from the geometric parameters of the module: (1) azimuthal offsets of each of the plurality of transducers relative to the at least one transducer from which the emitted acoustic signal was emitted; and (2) the DOT. Determining $V_{guided}$ may further utilize $V_{mud}$ and/or $ID_{cas}$.

The method may further comprise correcting the recorded data to account for eccentricity of the module within the casing, wherein $V_{guided}$ may be determined utilizing the corrected data. The recorded data may also be indicative of receipt of the specular wave by at least three of the plurality of transducers, and the method may further comprise determining eccentering of the module within the casing utilizing just: from the geometric parameters of the module, the DOT and azimuthal offsets of the at least three of the plurality of transducers; and from the recorded data, arrival times of the specular wave at each of the at least three of the plurality of transducers.

The method may further comprise utilizing $V_{guided}$ to determine a relationship between compressional and shear velocities of the casing. In such implementations, among others within the scope of the present disclosure: (A) the guided wave may comprise an extensional wave and a flexural wave; (B) determining $V_{guided}$ may comprise: (1) determining acoustic velocity of the extensional wave in the casing metal ($V_{extensional}$) utilizing the recorded data and geometric parameters of the module; and (2) determining acoustic velocity of the flexural wave in the casing metal ($V_{flexural}$) utilizing the recorded data and geometric parameters of the module; and (C) determining the relationship between the compressional and shear velocities of the casing comprises determining the compressional and shear velocities of the casing utilizing $V_{extensional}$ and $V_{flexural}$.

The emitted acoustic signal may comprise a plurality of frequencies and determining $V_{guided}$ may utilize ones of the received acoustic waveforms corresponding to at least two of the frequencies. In such implementations, among others within the scope of the present disclosure: (A) the guided wave may comprise an extensional wave and a flexural wave; (B) determining $V_{guided}$ may comprise determining, at each of the at least two of the frequencies, at least one of: (1) acoustic velocity of the extensional wave in the casing metal ($V_{extensional}$) utilizing the recorded data and geometric parameters of the module; and (2) acoustic velocity of the flexural wave in the casing metal ($V_{flexural}$) utilizing the recorded data and geometric parameters of the module; and (C) the method may further comprise determining at least one of a compressional velocity of the casing and a shear velocity of the casing utilizing: (1) at least one of the at least one of $V_{extensional}$ and $V_{flexural}$ at each of the at least two of the frequencies; and (2) a predetermined dispersion curve.

The present disclosure also introduces a system comprising a toolstring for conveyance within a cased portion of a borehole penetrating a subsurface formation, wherein the cased borehole portion comprises a metal casing and the toolstring comprises a module comprising a plurality of acoustic transducers distributed azimuthally around the toolstring and each operable to emit and receive acoustic signals. The module is operable to: (A) emit an acoustic signal, from at least one of the transducers, into fluid surrounding the module in the casing; and (B) record data indicative of receipt, by a plurality of the transducers, of acoustic waveforms resulting from interaction of the emitted acoustic signal with the casing, including at least a non-specular diffraction head wave excited by a guided wave that is excited by diffraction of the acoustic signal propagating in the casing metal. The system also comprises a processing system comprising a processor and a memory storing instructions executable by the processor for determining acoustic velocity of the guided wave in the casing metal ($V_{guided}$) utilizing the recorded data and geometric parameters of the module.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
    disposing a toolstring in a cased portion of a borehole penetrating a subsurface formation, wherein the cased borehole portion comprises a metal casing, and wherein the toolstring comprises a module comprising a plurality of acoustic transducers distributed azimuthally around the toolstring and each operable to emit and receive acoustic signals;
    operating the module to:
        emit an acoustic signal, from at least one of the transducers, into fluid surrounding the module in the casing; and
        record data indicative of receipt, by a plurality of the transducers, of acoustic waveforms resulting from interaction of the emitted acoustic signal with the casing, including at least a non-specular diffraction head wave excited by a guided wave that is excited by diffraction of the acoustic signal propagating in the casing metal; and
    determining acoustic velocity of the guided wave in the casing metal ($V_{guided}$) utilizing the recorded data and geometric parameters of the module.

2. The method of claim 1 wherein the module is a phased array module, and wherein the transducers are collectively operated by an electronics module that permits generating a beam that can be swept electronically.

3. The method of claim 1 wherein the guided wave is an extensional wave and/or a flexural wave.

4. The method of claim 1 wherein:
    the recorded data is first data; and
    the method further comprises:
        recording second data indicative of receipt, by one or more of the transducers, of the emitted acoustic signal; and
        determining acoustic velocity of the fluid ($V_{mud}$) utilizing the second data.

5. The method of claim 4 wherein determining $V_{mud}$ utilizes:
    from the second data, one or more arrival times of the emitted acoustic signal at the one or more transducers; and
    from the geometric parameters of the module:
        azimuthal offsets of each of the plurality of transducers relative to:
            each other one of the plurality of transducers; or
            the at least one transducer from which the emitted acoustic signal was emitted; and a collective outer diameter formed by radially outward extents of each of the plurality of transducers (DOT).

6. The method of claim 4 wherein:
the toolstring comprises a pressure sensor for obtaining pressure measurements of the fluid at a plurality of depths in the cased borehole portion; and
the method further comprises determining acoustic impedance of the fluid utilizing the pressure measurements and the determined $V_{mud}$.

7. The method of claim 4 further comprising utilizing at least one of the determined $V_{mud}$ or $V_{guided}$ to determine at least one of:
an internal diameter of the casing ($ID_{cas}$);
a wall thickness of the casing ($th_{cas}$);
an outer diameter of the casing ($OD_{cas}$); and
a resonance frequency of the casing ($f_{res}$).

8. The method of claim 4 wherein determining $V_{guided}$ utilizes:
from the recorded data, arrival times of the head wave at two or more of the plurality of transducers; and
from the geometric parameters of the module:
azimuthal offsets of each of the plurality of transducers relative to the at least one transducer from which the emitted acoustic signal was emitted; and
a collective outer diameter formed by radially outward extents of each of the plurality of transducers (DOT).

9. The method of claim 8 wherein determining $V_{guided}$ further utilizes $V_{mud}$ and/or an internal diameter of the casing ($ID_{cas}$).

10. The method of claim 1 further comprising correcting the recorded data to account for eccentricity of the module within the casing, wherein $V_{guided}$ is determined utilizing the corrected data.

11. The method of claim 1 further comprising utilizing $V_{guided}$ to determine a relationship between compressional and shear velocities of the casing.

12. The method of claim 11 wherein:
the guided wave comprises an extensional wave and a flexural wave;
determining $V_{guided}$ comprises:
determining acoustic velocity of the extensional wave in the casing metal ($V_{extensional}$) utilizing the recorded data and geometric parameters of the module; and
determining acoustic velocity of the flexural wave in the casing metal ($V_{flexural}$) utilizing the recorded data and geometric parameters of the module; and
determining the relationship between the compressional and shear velocities of the casing comprises determining the compressional and shear velocities of the casing utilizing $V_{extensional}$ and $V_{flexural}$.

13. The method of claim 1 wherein:
the emitted acoustic signal comprises a plurality of frequencies; and
determining $V_{guided}$ utilizes ones of the received acoustic waveforms corresponding to at least two of the frequencies.

14. The method of claim 13 wherein:
the guided wave comprises an extensional wave and a flexural wave;
determining $V_{guided}$ comprises determining, at each of the at least two of the frequencies, at least one of:
acoustic velocity of the extensional wave in the casing metal ($V_{extensional}$) utilizing the recorded data and geometric parameters of the module; and
acoustic velocity of the flexural wave in the casing metal ($V_{flexural}$) utilizing the recorded data and geometric parameters of the module; and
the method further comprises determining at least one of a compressional velocity of the casing and a shear velocity of the casing utilizing:
at least one of the at least one of $V_{extensional}$ and $V_{flexural}$ at each of the at least two of the frequencies; and
a predetermined dispersion curve.

15. A system comprising:
a toolstring for conveyance within a cased portion of a borehole penetrating a subsurface formation, wherein:
the cased borehole portion comprises a metal casing;
the toolstring comprises a module comprising a plurality of acoustic transducers distributed azimuthally around the toolstring and each operable to emit and receive acoustic signals; and
the module is operable to:
emit an acoustic signal, from at least one of the transducers, into fluid surrounding the module in the casing; and
record data indicative of receipt, by a plurality of the transducers, of acoustic waveforms resulting from interaction of the emitted acoustic signal with the casing, including at least a non-specular diffraction head wave excited by a guided wave that is excited by diffraction of the acoustic signal propagating in the casing metal; and
a processing system comprising a processor and a memory storing instructions executable by the processor for determining acoustic velocity of the guided wave in the casing metal ($V_{guided}$) utilizing the recorded data and geometric parameters of the module.

* * * * *